United States Patent
Englman et al.

(10) Patent No.: US 9,466,179 B2
(45) Date of Patent: Oct. 11, 2016

(54) GAMING MACHINE HAVING A COMMUNITY GAME WITH SIDE WAGERING

(75) Inventors: Allon G. Englman, Chicago, IL (US); Larry J. Pacey, Prospect Heights, IL (US); Peter A. Anderson, Chicago, IL (US); Jeremy M. Hornik, Chicago, IL (US)

(73) Assignee: Bally Gaming, Inc., Las Vegas, NV (US)

(*) Notice: Subject to any disclaimer, the term of this patent is extended or adjusted under 35 U.S.C. 154(b) by 2720 days.

(21) Appl. No.: 11/354,522

(22) Filed: Feb. 15, 2006

(65) Prior Publication Data

US 2006/0135243 A1 Jun. 22, 2006
US 2016/0027140 A9 Jan. 28, 2016

Related U.S. Application Data

(63) Continuation-in-part of application No. 11/223,296, filed on Sep. 9, 2005, now Pat. No. 7,780,531, which (Continued)

(51) Int. Cl.
*G07F 17/32* (2006.01)
*A63F 13/45* (2014.01)
*G06Q 50/34* (2012.01)

(52) U.S. Cl.
CPC ........... *G07F 17/3262* (2013.01); *A63F 13/45* (2014.09); *G06Q 50/34* (2013.01);
(Continued)

(58) Field of Classification Search
CPC ....................................................... A63F 9/24
USPC .......................................... 463/16, 20, 30, 42
See application file for complete search history.

(56) References Cited

U.S. PATENT DOCUMENTS 4,624,459 A 11/1986 Kaufman ................. 273/143 R
4,805,907 A * 2/1989 Hagiwara ........... G07F 17/3211
463/20
(Continued)

FOREIGN PATENT DOCUMENTS

CA 2334546 A1 8/2001 ............. G01F 17/34
DE 195 15 983 A1 11/1996 ............. G07F 17/34
(Continued)

OTHER PUBLICATIONS

Article for "Easy Riches" by Sigma Game, Strictly Slots, 1 page (Aug. 2001).
(Continued)

*Primary Examiner* — Jason Skaarup
(74) *Attorney, Agent, or Firm* — Nixon Peabody LLP

(57) ABSTRACT

According to one embodiment of the present invention, a system and method for conducting a wagering game on a plurality of gaming machines is disclosed. The method comprises the act of triggering a community event while conducting the wagering game on the plurality of gaming machines. Two or more gaming machines are selected to participate in the community event. The community event is selected from a plurality of independent community events. The gaming system comprises a plurality of gaming machines, at least one community display, and at least one controller. The controller is operative to select the two or more gaming machines to participate in the community event, and select the community event from the plurality of independent community events to display on the at least one community display.

20 Claims, 18 Drawing Sheets

Related U.S. Application Data is a continuation-in-part of application No. 10/612,478, filed on Jul. 2, 2003, now Pat. No. 7,662,040, and a continuation-in-part of application No. PCT/US2005/015687, filed on May 5, 2005.

(60) Provisional application No. 60/570,583, filed on May 13, 2004.

(52) U.S. Cl.
CPC .......... *G07F 17/32* (2013.01); *G07F 17/3211* (2013.01); *G07F 17/3227* (2013.01); *G07F 17/3276* (2013.01); *G07F 17/3286* (2013.01)

(56) References Cited

U.S. PATENT DOCUMENTS

| | | | |
|---|---|---|---|
| 4,837,728 A | 6/1989 | Barrie et al. ................. 364/412 |
| 4,861,041 A | 8/1989 | Jones et al. ................... 273/292 |
| 4,948,134 A | 8/1990 | Suttle et al. ..................... 273/85 |
| 5,116,055 A | 5/1992 | Tracy ........................ 273/138 A |
| 5,249,800 A | 10/1993 | Hilgendorf et al. ....... 273/138 A |
| 5,275,400 A | 1/1994 | Weingardt ...................... 273/85 |
| 5,280,909 A | 1/1994 | Tracy ........................ 273/138 A |
| 5,344,144 A | 9/1994 | Canon ........................ 273/138 A |
| 5,377,973 A | 1/1995 | Jones et al. ................ 273/85 CP |
| 5,393,057 A | 2/1995 | Marnell, II ............... 273/85 CP |
| 5,417,430 A | 5/1995 | Breeding ...................... 273/292 |
| 5,524,888 A | 6/1996 | Heidel ............................ 463/22 |
| 5,554,892 A | 9/1996 | Norimatsu .................... 307/115 |
| 5,564,700 A | 10/1996 | Celona ............................ 463/27 |
| 5,577,959 A | 11/1996 | Takemoto ...................... 463/25 |
| 5,580,063 A | 12/1996 | Edwards ....................... 273/378 |
| 5,580,309 A | 12/1996 | Piechowiak et al. ........... 463/26 |
| 5,611,730 A | 3/1997 | Weiss ............................ 463/20 |
| 5,645,486 A | 7/1997 | Nagao et al. .................. 463/27 |
| 5,647,592 A | 7/1997 | Gerow .......................... 463/139 |
| 5,655,961 A | 8/1997 | Acres et al. ................... 463/27 |
| 5,766,076 A | 6/1998 | Pease et al. ................... 463/27 |
| RE35,864 E | 7/1998 | Weingardt ...................... 463/27 |
| 5,779,549 A | 7/1998 | Walker et al. ................. 463/42 |
| 5,816,918 A | 10/1998 | Kelly et al. .................... 463/16 |
| 5,820,459 A | 10/1998 | Acres et al. ................... 463/25 |
| 5,823,874 A | 10/1998 | Adams .......................... 463/17 |
| 5,830,063 A | 11/1998 | Byrne ............................ 463/25 |
| 5,839,956 A | 11/1998 | Takemoto ...................... 463/18 |
| 5,848,932 A | 12/1998 | Adams .......................... 463/20 |
| 5,851,147 A | 12/1998 | Stupak .......................... 463/13 |
| 5,851,148 A * | 12/1998 | Brune ........................ A63F 1/18 463/25 |
| 5,855,515 A | 1/1999 | Pease et al. ................... 463/27 |
| 5,876,284 A | 3/1999 | Acres et al. ................... 463/25 |
| 5,885,158 A | 3/1999 | Torango et al. ............... 463/25 |
| 5,941,773 A | 8/1999 | Harlick ......................... 463/26 |
| 5,944,606 A | 8/1999 | Gerow .......................... 463/27 |
| 5,951,011 A | 9/1999 | Potter et al. .................. 273/292 |
| 5,975,528 A | 11/1999 | Halaby ......................... 273/148 |
| 5,993,316 A * | 11/1999 | Coyle et al. ................... 463/25 |
| 6,003,013 A | 12/1999 | Boushy et al. ................. 705/10 |
| 6,007,427 A | 12/1999 | Wiener et al. ................. 463/17 |
| 6,012,982 A | 1/2000 | Piechowiak et al. ........... 463/16 |
| 6,020,884 A | 2/2000 | MacNaughton et al. ..... 345/329 |
| 6,032,955 A | 3/2000 | Luciano et al. ............ 273/138.1 |
| 6,039,648 A | 3/2000 | Guinn et al. ................... 463/16 |
| 6,047,963 A | 4/2000 | Pierce et al. ................. 273/121 B |
| 6,077,162 A | 6/2000 | Weiss ............................ 463/20 |
| 6,089,976 A | 7/2000 | Schnieder et al. ............. 463/16 |
| 6,089,977 A | 7/2000 | Bennett ......................... 463/20 |
| 6,089,980 A | 7/2000 | Gauselmann .................. 463/27 |
| 6,102,474 A | 8/2000 | Daley .......................... 296/836 |
| 6,102,798 A | 8/2000 | Bennett ......................... 463/16 |
| 6,102,799 A | 8/2000 | Stupak .......................... 463/27 |
| 6,110,043 A | 8/2000 | Olsen ............................ 463/27 |
| 6,139,013 A | 10/2000 | Pierce et al. ................ 273/121 B |
| 6,142,872 A | 11/2000 | Walker et al. ................. 463/16 |
| 6,146,273 A | 11/2000 | Olsen ............................ 463/27 |
| 6,155,925 A | 12/2000 | Giobbi et al. .................. 463/20 |
| 6,158,741 A | 12/2000 | Koelling ....................... 273/292 |
| 6,159,097 A | 12/2000 | Gura ............................. 463/20 |
| 6,168,155 B1 | 1/2001 | Kuhlman et al. ............. 273/144 |
| 6,168,523 B1 | 1/2001 | Piechowiak et al. ........... 463/26 |
| 6,203,010 B1 | 3/2001 | Jorasch et al. ............ 273/138.1 |
| 6,203,429 B1 | 3/2001 | Demar et al. .................. 463/20 |
| 6,206,374 B1 | 3/2001 | Jones ............................ 463/26 |
| 6,206,782 B1 | 3/2001 | Walker et al. ................. 463/25 |
| 6,210,275 B1 | 4/2001 | Olsen ............................ 463/16 |
| 6,210,277 B1 | 4/2001 | Stefan ........................... 463/27 |
| 6,217,448 B1 | 4/2001 | Olsen ............................ 463/25 |
| 6,220,593 B1 | 4/2001 | Pierce et al. ............... 273/138.1 |
| 6,224,482 B1 | 5/2001 | Bennett ......................... 463/20 |
| 6,224,484 B1 | 5/2001 | Okuda et al. .................. 463/27 |
| 6,231,445 B1 | 5/2001 | Acres ............................ 463/27 |
| 6,238,288 B1 * | 5/2001 | Walker ................... G06Q 30/02 463/20 |
| 6,241,608 B1 | 6/2001 | Torango ........................ 463/27 |
| 6,254,483 B1 | 7/2001 | Acres ............................ 463/26 |
| 6,299,533 B1 | 10/2001 | Parra et al. .................... 463/17 |
| 6,312,332 B1 | 11/2001 | Walker et al. ................. 463/23 |
| 6,315,660 B1 | 11/2001 | DeMar et al. ................. 463/16 |
| 6,319,125 B1 | 11/2001 | Acres ............................ 463/25 |
| 6,319,127 B1 | 11/2001 | Walker et al. ................. 463/26 |
| 6,336,857 B1 | 1/2002 | McBride ....................... 463/12 |
| 6,336,859 B2 | 1/2002 | Jones et al. ................... 463/42 |
| 6,336,862 B1 | 1/2002 | Byrne ............................ 463/27 |
| 6,345,824 B1 | 2/2002 | Selitzky ....................... 273/292 |
| 6,347,996 B1 | 2/2002 | Gilmore et al. ............... 463/17 |
| 6,352,479 B1 | 3/2002 | Sparks, II ...................... 463/42 |
| 6,358,149 B1 | 3/2002 | Schneider et al. ............. 463/27 |
| 6,361,441 B1 | 3/2002 | Walker et al. ................. 463/42 |
| 6,364,768 B1 | 4/2002 | Acres et al. ................... 463/25 |
| 6,375,567 B1 | 4/2002 | Acres ............................ 463/25 |
| 6,375,568 B1 | 4/2002 | Roffman et al. ............... 463/26 |
| 6,406,369 B1 | 6/2002 | Baerlocher et al. ........... 463/20 |
| 6,416,408 B2 | 7/2002 | Tracy et al. ................... 463/29 |
| 6,416,409 B1 | 7/2002 | Jordan .......................... 463/27 |
| 6,422,940 B1 | 7/2002 | Walker et al. ................. 463/13 |
| 6,431,983 B2 | 8/2002 | Acres ............................ 463/25 |
| 6,435,968 B1 | 8/2002 | Torango ........................ 463/27 |
| 6,439,995 B1 | 8/2002 | Hughs-Baird et al. ........ 463/20 |
| 6,482,089 B2 | 11/2002 | DeMar et al. ................. 463/20 |
| 6,506,117 B2 | 1/2003 | DeMar et al. ................. 463/20 |
| 6,508,707 B2 | 1/2003 | DeMar et al. ................. 463/16 |
| 6,508,709 B1 | 1/2003 | Karmarkar .................... 463/42 |
| 6,517,433 B2 | 2/2003 | Loose et al. ................... 463/20 |
| 6,520,855 B2 | 2/2003 | DeMar et al. ................. 463/20 |
| 6,569,016 B1 * | 5/2003 | Baerlocher .................... 463/16 |
| 6,577,733 B1 | 6/2003 | Charrin ....................... 380/251 |
| 6,589,115 B2 | 7/2003 | Walker et al. ................. 463/25 |
| 6,592,458 B1 | 7/2003 | Ho ................................ 463/17 |
| 6,592,460 B2 | 7/2003 | Torango ........................ 463/27 |
| 6,599,186 B1 | 7/2003 | Walker et al. ................. 463/17 |
| 6,599,188 B2 | 7/2003 | Hirsch et al. .................. 463/19 |
| 6,599,193 B2 | 7/2003 | Baerlocher et al. ........... 463/27 |
| 6,601,771 B2 | 8/2003 | Charrin ....................... 235/492 |
| 6,609,673 B1 | 8/2003 | Johnson ...................... 242/423 |
| 6,648,753 B1 | 11/2003 | Tracy et al. ................... 463/16 |
| 6,648,762 B2 | 11/2003 | Walker et al. ................. 463/25 |
| 6,652,378 B2 * | 11/2003 | Cannon et al. ................ 463/20 |
| 6,656,052 B2 | 12/2003 | Abramopoulos et al. ...... 463/47 |
| 6,676,513 B2 | 1/2004 | Gauselmann .................. 463/20 |
| 6,685,560 B2 | 2/2004 | Hughes ......................... 463/16 |
| 6,692,354 B2 | 2/2004 | Tracy et al. ................... 463/30 |
| 6,712,695 B2 | 3/2004 | Mothwurf et al. ............. 463/25 |
| 6,712,699 B2 | 3/2004 | Walker et al. ................. 463/42 |
| 6,733,390 B2 | 5/2004 | Walker et al. ................. 463/23 |
| 6,776,715 B2 | 8/2004 | Price ............................. 463/27 |
| 6,790,141 B2 | 9/2004 | Muir ............................. 463/42 |
| 6,837,793 B2 | 1/2005 | McClintic ..................... 463/42 |
| 6,869,361 B2 | 3/2005 | Sharpless ...................... 463/25 |
| 6,887,154 B1 | 5/2005 | Luciano, Jr. et al. .......... 463/26 |
| 6,887,159 B2 | 5/2005 | Leen et al. .................... 463/42 |
| 7,004,466 B2 | 2/2006 | Gauselmann ................ 463/138 |
| 7,036,012 B2 | 4/2006 | Charrin ....................... 213/169 |
| 7,056,215 B1 | 6/2006 | Olive ............................ 463/27 |

(56) References Cited

U.S. PATENT DOCUMENTS

| | | | |
|---|---|---|---|
| 2002/0025845 A1* | 2/2002 | Cannon | G07F 17/32 463/16 |
| 2002/0039923 A1* | 4/2002 | Cannon | G07F 17/32 463/42 |
| 2002/0138594 A1 | 9/2002 | Rowe | 709/219 |
| 2002/0151345 A1 | 10/2002 | Byrne | 463/18 |
| 2002/0155874 A1 | 10/2002 | Byrne | 463/16 |
| 2002/0187836 A1* | 12/2002 | Meyer | G07F 17/32 463/42 |
| 2003/0014370 A1 | 1/2003 | Charrin | 17/60 |
| 2003/0027618 A1 | 2/2003 | Byrne | 463/16 |
| 2003/0027625 A1 | 2/2003 | Rowe | 463/20 |
| 2003/0036430 A1 | 2/2003 | Cannon | 463/42 |
| 2003/0045337 A1 | 3/2003 | Byrne | 463/16 |
| 2003/0047874 A1 | 3/2003 | Leen et al. | 273/292 |
| 2003/0060106 A1 | 3/2003 | Haggquist et al. | 442/131 |
| 2003/0060266 A1 | 3/2003 | Baerlocher | 463/20 |
| 2003/0064776 A1 | 4/2003 | Byrne | 463/16 |
| 2003/0064807 A1 | 4/2003 | Walker | 463/42 |
| 2003/0078091 A1* | 4/2003 | Brandstetter | G07F 17/32 463/20 |
| 2003/0109306 A1 | 6/2003 | Karmakar | 463/40 |
| 2003/0114218 A1 | 6/2003 | McClintic | 463/25 |
| 2003/0119576 A1 | 6/2003 | McClintic | 463/20 |
| 2003/0148808 A1 | 8/2003 | Price | 463/27 |
| 2003/0181231 A1 | 9/2003 | Vancura et al. | 463/9 |
| 2003/0186733 A1 | 10/2003 | Wolf et al. | 463/16 |
| 2003/0211884 A1 | 11/2003 | Gauselmann | 463/20 |
| 2003/0216166 A1* | 11/2003 | Baerlocher | G07F 17/3258 463/20 |
| 2003/0222402 A1 | 12/2003 | Olive | 273/292 |
| 2003/0224852 A1 | 12/2003 | Walker | 463/20 |
| 2003/0228899 A1 | 12/2003 | Evans | 463/25 |
| 2003/0236110 A1* | 12/2003 | Beaulieu | G07F 17/32 463/1 |
| 2003/0236116 A1 | 12/2003 | Marks et al. | 463/16 |
| 2004/0009808 A1 | 1/2004 | Gauselmann | 463/25 |
| 2004/0009811 A1 | 1/2004 | Torango | 463/25 |
| 2004/0023716 A1 | 2/2004 | Gauselmann | 463/23 |
| 2004/0038741 A1 | 2/2004 | Gauselmann | 463/42 |
| 2004/0048644 A1 | 3/2004 | Gerrard et al. | 463/16 |
| 2004/0087357 A1* | 5/2004 | Johnson | G07F 17/32 463/17 |
| 2004/0087368 A1* | 5/2004 | Gauselmann | G07F 17/32 463/42 |
| 2004/0092304 A1 | 5/2004 | George | 463/29 |
| 2004/0106448 A1 | 6/2004 | Gauselmann | 463/25 |
| 2004/0132524 A1 | 7/2004 | Ramstad et al. | 463/16 |
| 2004/0204226 A1 | 10/2004 | Foster et al. | 463/20 |
| 2004/0204235 A1 | 10/2004 | Walker et al. | 463/16 |
| 2004/0214628 A1* | 10/2004 | Boyd | G07F 17/32 463/20 |
| 2004/0235552 A1 | 11/2004 | Gauselman | 463/16 |
| 2004/0242297 A1 | 12/2004 | Walker et al. | 463/16 |
| 2004/0242303 A1 | 12/2004 | Walker et al. | 463/16 |
| 2004/0242320 A1* | 12/2004 | Jackson | G07F 17/32 463/26 |
| 2004/0248651 A1 | 12/2004 | Gagner et al. | 463/42 |
| 2005/0003880 A1 | 1/2005 | Englman | 463/16 |
| 2005/0003886 A1 | 1/2005 | Englman et al. | 463/25 |
| 2005/0014554 A1 | 1/2005 | Walker | 463/20 |
| 2005/0026674 A1 | 2/2005 | Wolf et al. | 463/19 |
| 2005/0037841 A1* | 2/2005 | de Waal | A63F 13/12 463/29 |
| 2005/0055113 A1 | 3/2005 | Gauselmann | 700/91 |
| 2005/0059467 A1 | 3/2005 | Saffari et al. | 463/19 |
| 2005/0059472 A1 | 3/2005 | Joshi et al. | 463/20 |
| 2005/0064930 A1 | 3/2005 | Jubinville et al. | 463/17 |
| 2005/0096130 A1 | 5/2005 | Mullins | 463/27 |
| 2005/0137010 A1 | 6/2005 | Enzminger et al. | 463/25 |
| 2005/0148382 A1 | 7/2005 | Fox | 463/19 |
| 2005/0187008 A1 | 8/2005 | Nakajima | 463/16 |
| 2005/0192073 A1 | 9/2005 | Nakajima | 463/27 |
| 2005/0192088 A1 | 9/2005 | Hartman et al. | 463/27 |
| 2005/0215313 A1 | 9/2005 | O'Halloran | 463/26 |
| 2005/0239542 A1* | 10/2005 | Olsen | G07F 17/32 463/27 |
| 2005/0282628 A1 | 12/2005 | Beatty | 463/27 |
| 2006/0003829 A1 | 1/2006 | Thomas | 463/20 |
| 2006/0009283 A1 | 1/2006 | Englman et al. | 463/16 |
| 2006/0019737 A1 | 1/2006 | Yang | 463/19 |
| 2006/0025195 A1 | 2/2006 | Pennington et al. | 463/16 |
| 2006/0025210 A1 | 2/2006 | Johnson | 463/25 |
| 2006/0030403 A1 | 2/2006 | Lafky et al. | 463/27 |
| 2006/0052159 A1 | 3/2006 | Cahill et al. | 463/27 |
| 2006/0073887 A1 | 4/2006 | Nguyen et al. | 463/20 |
| 2006/0073889 A1 | 4/2006 | Edidin et al. | 463/27 |
| 2006/0116201 A1 | 6/2006 | Gauselmann | 463/26 |
| 2006/0121971 A1* | 6/2006 | Slomiany et al. | 463/16 |
| 2006/0142079 A1 | 6/2006 | Ikehara et al. | 463/27 |
| 2006/0142086 A1 | 6/2006 | Blackburn et al. | 463/42 |
| 2006/0154718 A1 | 7/2006 | Willyard et al. | 463/25 |
| 2006/0178203 A1 | 8/2006 | Hughes et al. | 463/20 |
| 2006/0183535 A1 | 8/2006 | Marks et al. | 463/20 |
| 2006/0183537 A1 | 8/2006 | Dickerson | 463/27 |
| 2006/0183538 A1 | 8/2006 | Michaelson et al. | 463/27 |
| 2006/0281527 A1 | 12/2006 | Dunaevsky et al. | 463/20 |
| 2006/0287077 A1 | 12/2006 | Grav et al. | 463/27 |
| 2007/0026941 A1 | 2/2007 | Block et al. | 463/29 |
| 2007/0054733 A1 | 3/2007 | Baerlocher | 463/27 |
| 2007/0060244 A1 | 3/2007 | Yaldoo et al. | 463/16 |
| 2007/0060271 A1 | 3/2007 | Cregan et al. | 463/16 |
| 2007/0060314 A1 | 3/2007 | Baerlocher et al. | 463/25 |
| 2007/0060319 A1 | 3/2007 | Block et al. | 463/27 |
| 2007/0060365 A1 | 3/2007 | Tien et al. | 463/42 |

FOREIGN PATENT DOCUMENTS

| | | | | |
|---|---|---|---|---|
| DE | 196 24 321 A1 | 1/1998 | | G07F 17/32 |
| EP | 0 521 599 A1 | 1/1993 | | G07F 17/34 |
| GB | 2 153 572 A | 8/1985 | | G07F 17/34 |
| GB | 2 181 589 A | 4/1987 | | G07F 17/34 |
| GB | 2 242 300 A | 9/1991 | | G07F 17/34 |
| GB | 2 313 792 A | 12/1997 | | |
| GB | 2 333 880 | 8/1999 | | G07F 17/34 |
| WO | WO 99/03078 A1 | 1/1999 | | G07F 17/34 |
| WO | WO 99/19037 A1 | 4/1999 | | A63F 9/22 |
| WO | WO 01/33/478 A1 | 5/2001 | | G07F 17/34 |
| WO | WO 03/026754 A1 | 4/2003 | | A63F 5/00 |
| WO | WO 03/083789 A1 | 10/2003 | | |

OTHER PUBLICATIONS

Article for "Millioniser" by Glenn Haussman, Strictly Slots, pp. 50-53 (Mar. 2004).
Product Sheet for "Big Games Safari," IGT, 24 pages (2000).
"New '97 Games," International Gaming & Wagering Business, 24 pages (Mar. 1997).
PCT International Search Report for International Application No. PCT/US2006/34407 dated Sep. 28, 2007 (2 pages).
International Search Report—PCT/US06/20979 dated Nov. 13, 2006 (2 pages).

* cited by examiner

GAMING MACHINE HAVING A COMMUNITY GAME WITH SIDE WAGERING

CROSS REFERENCE TO RELATED APPLICATIONS

This application is
(1) a continuation-in-part of U.S. application Ser. No. 11/223,296, filed Sep. 9, 2005, now issued as U.S. Pat. No. 7,780,531 which is a continuation-in-part of U.S. Application Ser. No. 10/612,478, filed Jul. 2, 2003, now issued as U.S. Pat. No. 7,662,040; and
(2) a continuation-in-part of International Application No. PCT/US2005/015687, filed May 5, 2005, which claims the benefit of U.S. Provisional Application No. 60/570,583, filed May 13, 2004;

U.S. application Ser. No. 11/223,296 and U.S. application Ser. No. 10/612,478 being each incorporated herein by reference in its entirety.

FIELD OF THE INVENTION

The present invention relates generally to gaming machines and, more particularly, to a gaming machine and a gaming system having a community event provided with a plurality of communal features.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available because such machines attract frequent play and, hence, increase profitability to the operator. In the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is that of a "secondary" or "bonus" game which may be played in conjunction with a "basic" game. The bonus game may comprise any type of game, either similar to or completely different from the basic game, and is entered upon the occurrence of a selected event or outcome of the basic game. Such a bonus game produces a significantly higher level of player excitement than the basic game because it provides a greater expectation of winning than the basic game.

Another concept that has been employed is the use of a progressive jackpot. In the gaming industry, a "progressive" involves the collecting of coin-in data from participating gaming device(s) (e.g., slot machines), contributing a percentage of that coin-in data to a jackpot amount, and awarding that jackpot amount to a player upon the occurrence of a certain jackpot-won event. A jackpot-won event typically occurs when a "progressive winning position" is achieved at a participating gaming device. If the gaming device is a slot machine, a progressive winning position may, for example, correspond to alignment of progressive jackpot reel symbols along a certain pay line. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement. In existing progressive games, once a player at a first gaming machine enters the progressive game, the players at the other gaming machines are not involved in the progressive game. In other words, the other players do not get the opportunity to participate in the progressive game.

While these player appeal features provide some enhanced excitement relative to other known games, there is a continuing need to develop new features for gaming machines to satisfy the demands of players and operators. Specifically, the current progressive games only provide enhanced excitement to the player invited to play for the jackpot. Thus, there is a need for engaging multiple players after one player enters a communal game.

SUMMARY OF THE INVENTION

In accordance with one aspect of the present invention, a method for conducting a communal wagering game on a plurality of gaming machines is disclosed. The method comprises the acts of providing a community display for displaying a community event thereon and selecting two or more gaming machines from the plurality of gaming machines to participate in the community event. The method further comprises the acts of selecting, from a plurality of independent community events, the community event to be displayed on the community display, and providing an award to each of the selected two or more gaming machines based on the outcome of the selected community event displayed on the community display.

In accordance with another aspect of the present invention, a gaming system for playing a wagering game is disclosed. The gaming system comprises a plurality of gaming machines, at least one community display, and at least one controller. The plurality of gaming machines is adapted to display at least one basic wagering game thereon and to provide an award therefrom. The at least one community display displays a community event thereon. The at least one controller is in communication with the at least one community display and the plurality of gaming machines. The controller is operative to, (i) select two or more gaming machines from the plurality of gaming machines to participate in the community event, and (ii) select, from a plurality of independent community events, the community event to be displayed on the community display.

In accordance with yet another aspect of the present invention, a method for conducting at least one wagering game on a plurality of gaming machines is disclosed. The method comprises the act of triggering a community event while conducting the at least one wagering game on the plurality of gaming machines. The method further comprises the act of selecting two or more gaming machines from the plurality of gaming machines to participate in the community event. The method further comprises the act of selecting the community event from a plurality of independent community events.

The above summary of the present invention is not intended to represent each embodiment, or every aspect, of the present invention. This is the purpose of the figures and the detailed description which follow.

BRIEF DESCRIPTION OF THE DRAWINGS

The foregoing and other advantages of the invention will become apparent upon reading the following detailed description and upon reference to the drawings.

FIG. 15b is an illustration of a final game screen for the value-selector community event of FIG. 15a.

FIG. 16b is an illustration of the selection of a selectable symbol along a selection chain of the progressive community event of FIG. 16a.

Figure 1:
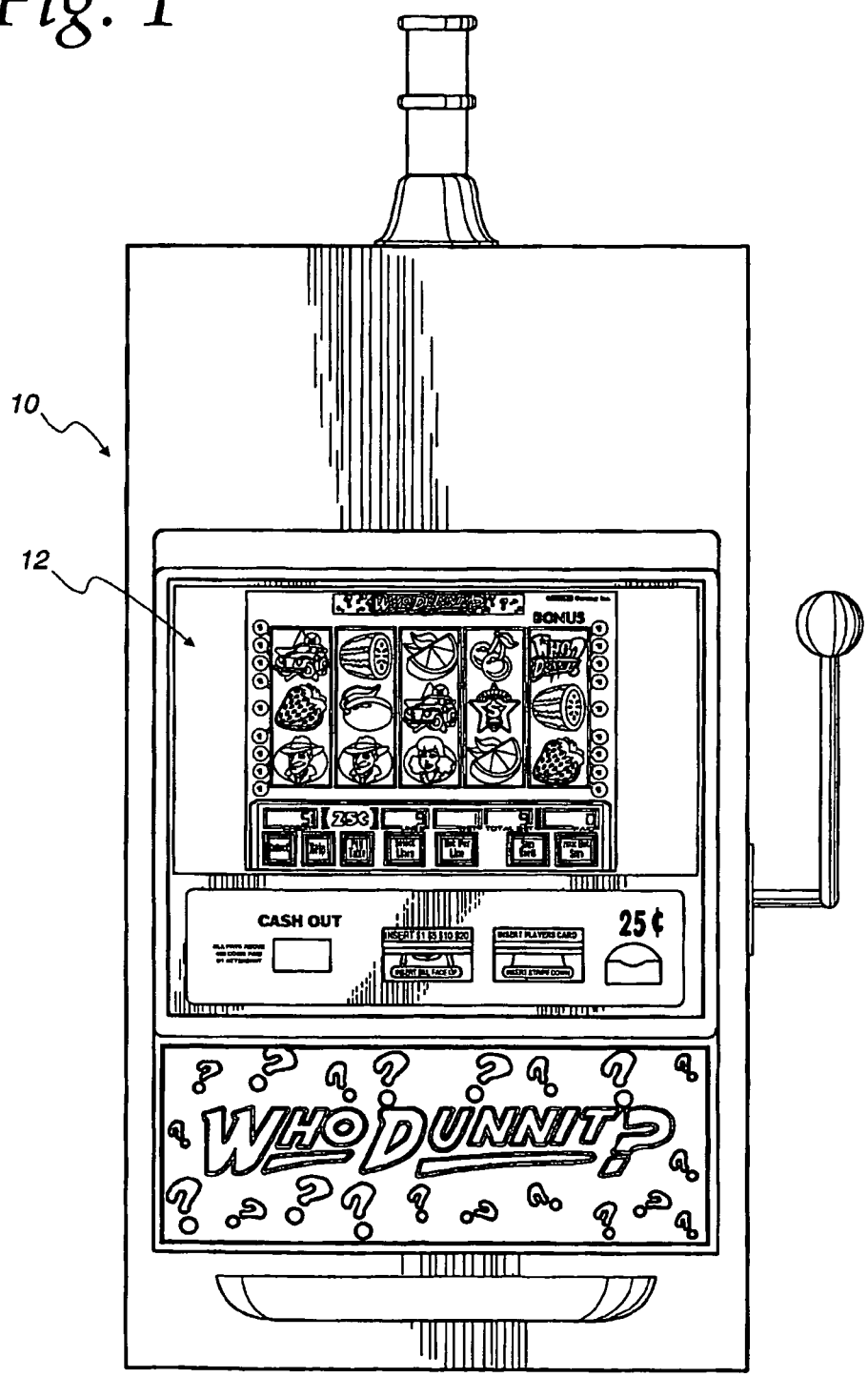
FIG. 1 is a perspective view of a video gaming machine according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings and referring initially to FIG. 1, a video gaming machine 10 is depicted that may be used to implement the enhanced progressive game according to the present invention. The gaming machine 10 includes a video display 12 that may comprise a CRT, LCD, plasma, LED, electro-luminescent display, or generally any type of video display known in the art. In the illustrated embodiment, the gaming machine 10 is an "upright" version in which the video display 12 includes a touch screen and is oriented vertically relative to the player. It will be appreciated, however, that any of several other models of gaming machines are within the scope of the present invention, including, for example, a "slant-top" version in which the video display is slanted at about a 30° angle toward the player, or gaming machines that include mechanical, rather than video, displays.

In one embodiment, the gaming machine 10 is operable to play a game entitled WHO DUNNIT?™ having a mystery theme. The WHO DUNNIT?™ game features a basic game in the form of a slot machine with five simulated spinning reels and a bonus game with selection options directing game activities on the video display 12. Such a gaming machine is disclosed in detail in U.S. Publication No. US 2002/0090990 A1, which is incorporated herein by reference in its entirety. It will be appreciated, however, that the gaming machine 10—may be implemented with games other than the WHO DUNNIT?™ game and/or with several alternative game themes.

Figure 2:
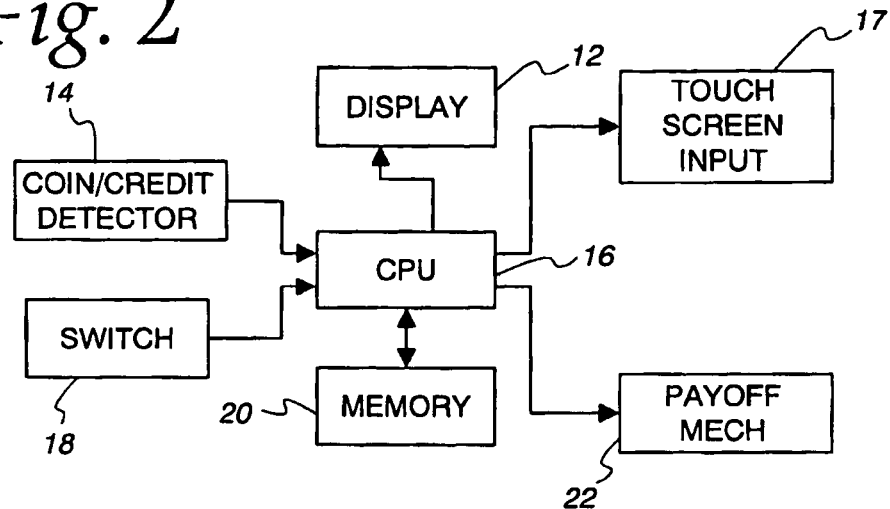
FIG. 2 is a block diagram of the gaming machine of FIG. 1.

FIG. 2 is a block diagram of a control system suitable for operating the gaming machine 10. Coin/credit detector 14 signals a CPU 16 when a player has inserted a number of coins or played a number of credits. Then, the CPU 16 executes a game program which causes the video display 12 to display the basic game that includes simulated reels with symbols displayed thereon. The player may select the number of paylines to play and the amount to wager via touch screen input keys 17. The basic game commences in response to the player activating a switch 18 in a lever or push button, causing the CPU 16 to set the reels in motion, randomly select a game outcome, and then stop the reels to display symbols corresponding to the pre-selected game outcome. Preferably, certain basic game outcomes cause the CPU 16 to enter a bonus mode, which causes the video display 12 to show a bonus game, as is known in the art.

A system memory 20 stores control software, operational instructions, and data associated with the gaming machine 10. In one embodiment, the system memory 20 comprises a separate read-only memory (ROM) and battery-backed random-access memory (RAM). It will be appreciated, however, that the system memory 20 may be implemented on any of several alternative types of memory structures or may be implemented on a single memory structure. To provide gaming functions, the CPU 16 executes one or more game programs stored in a computer readable storage medium, in the form of the system memory 20. A payoff mechanism 22 is operable in response to instructions from the CPU 16 to award a payoff of coins or credits to the player in response to certain winning outcomes which may occur in the basic game or bonus game. The payoff amounts corresponding to certain combinations of symbols in the basic game are predetermined according to a pay table stored in system memory 20. The payoff amounts corresponding to certain outcomes of the bonus game are also stored in system memory 20.

The gaming machine 10 of FIGS. 1 and 2 is a gaming terminal that receives inputs, randomly selects outputs and displays outputs, as controlled by the internal CPU 16. It will be appreciated, however, that the present invention can be used by gaming terminals controlled by external CPUs.

While the gaming machine 10 of FIGS. 1 and 2 has been described with respect to providing a player a basic game and a bonus game, the gaming machine 10 can be connected to a progressive game to which several gaming machines are linked. This gaming network and, in particular, the novel side wagering feature that can be activated by the player of the gaming machine 10 will be described below with reference to FIGS. 3-7.

Figure 3:
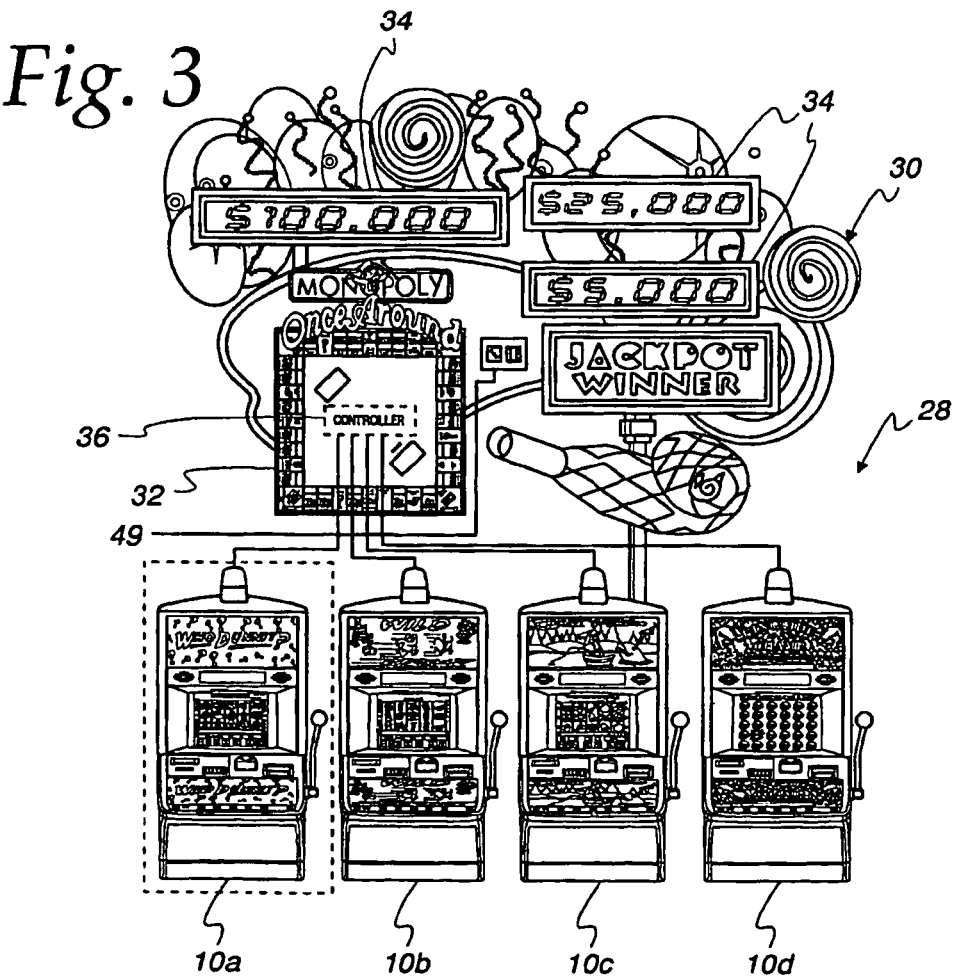
FIG. 3 is a gaming system of interconnected video gaming machines and signage according to one embodiment of the present invention, one gaming machine achieving a progressive game and the other three gaming machines being able to make a side wager on the progressive game.

Referring now to FIG. 3, a gaming system 28 of gaming machines 10*a*, 10*b*, 10*c*, 10*d* is shown. The four gaming machines 10*a*, 10*b*, 10*c*, 10*d* are of the type described above in relation to FIGS. 1 and 2. The four gaming machines 10*a*, 10*b*, 10*c*, 10*d* are interconnected and included under signage 30. The signage 30 includes a game screen 32 for displaying the progressive game which, in this embodiment, is the MONOPOLY ONCE AROUND™ game, and at least one jackpot screen 34 displaying a plurality of dollar amounts for a multi-level progressive game. In this embodiment, there are three dollar amount levels: a Mini Jackpot, a Maxi Jackpot, and a Mega Jackpot. In other embodiments, there may be any number of progressive jackpots.

The signage 30 includes a signage controller 36 that is connected to each of the four gaming machines 10*a*, 10*b*, 10*c*, 10*d*. The signage controller 36 transmits information to and receives information from the CPU 16 (FIG. 2) in each of the four gaming machines 10*a*, 10*b*, 10*c*, 10*d* throughout the game. The gaming system 28 allows for various aspects of the gaming machines 10*a*, 10*b*, 10*c*, 10*d*, such as playing progressive games to be controlled through the signage controller 36 in the signage 30. Thus, all of the gaming machines 10*a*, 10*b*, 10*c*, 10*d* are linked to the progressive game.

Figure 4:
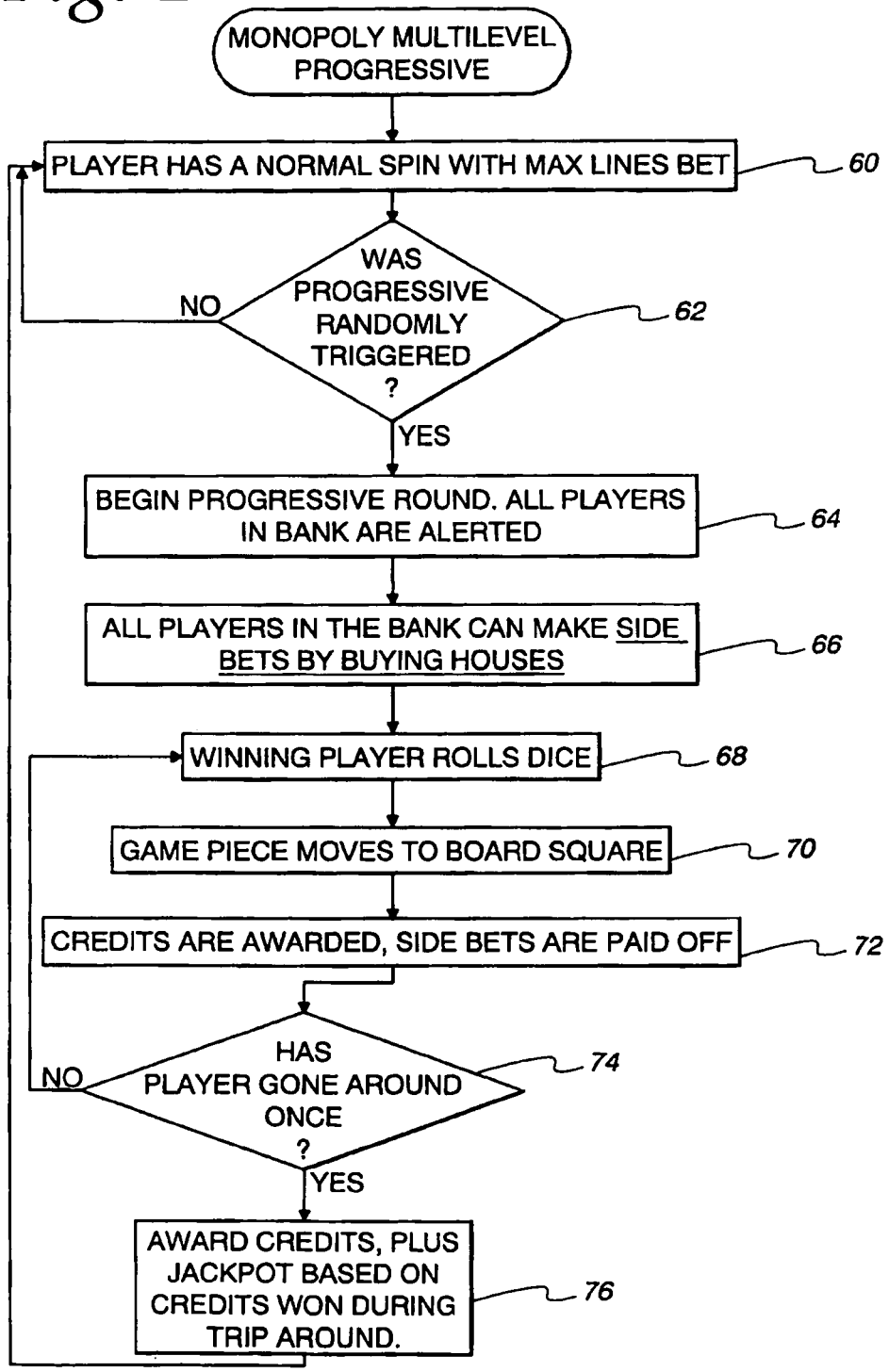
FIG. 4 is a flowchart describing the operation of the gaming machines and the signage of FIG. 3.

Turning now to FIG. 4, the operation of the progressive game of the gaming system 28 will be described. Reference to FIGS. 5-8 will be made to best describe this operation. In step 60, a player at the gaming machine 10 begins a game by any conventional method (e.g., inserting coins or using credits). Each gaming machine 10*a*, 10*b*, 10*c*, 10*d* has a basic game that involves a player choosing a number of paylines to play and choosing a wager to place on each payline. In some embodiments, there are a maximum of nine paylines. After choosing how many paylines to play, the player selects how many credits (e.g., 1-5) to wager on each payline. Any player who plays the maximum number of paylines—in the case of the WHO DUNNIT™ gaming machine 10, nine paylines—is eligible to be invited to play in the progressive game. At step 62, it is determined if the progressive game has been randomly triggered by the CPU 16 of the gaming machine 10. This happens when a start progressive outcome, e.g, a combination of jackpot signals, occurs on the screen. If the progressive outcome is not reached, then the gaming machine 10 continues to operate normally. Thus, the player continues to choose the wager amount for each line, spins the reels, and any pay out or bonus games are played normally. Once the game ends, the player is either paid out or more coins/credits are requested for another game.

Figure 5:
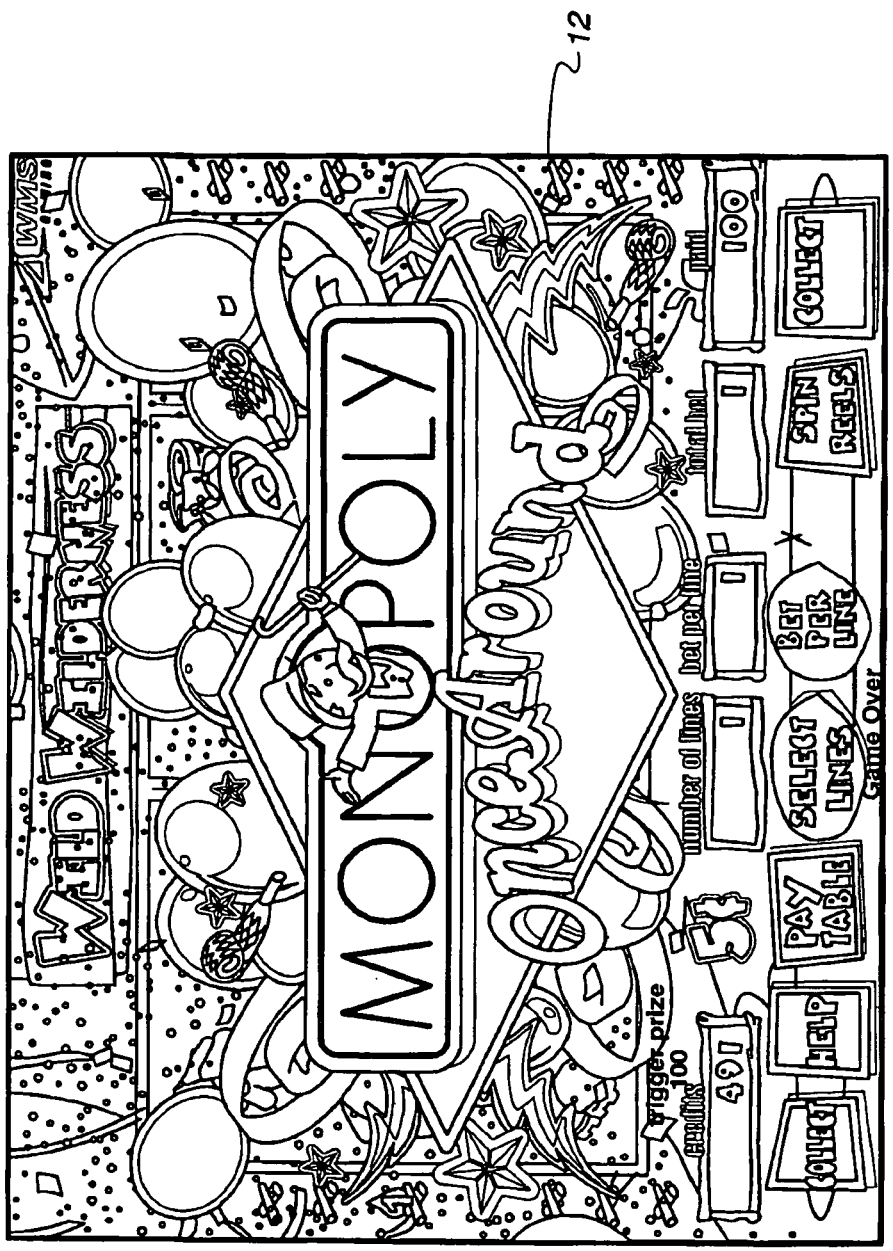
FIG. 5 is an illustration of a progressive game screen which may be implemented on the gaming machine achieving the progressive game at step 62 of FIG. 4.

If, at step 62, one of the gaming machines 10*a*—which will be referred to as the progressive play gaming machine 10*a*—has been selected for the progressive game, the basic game initially continues as normal, with the player playing the basic game and any bonus games. The CPU 16 of the progressive play gaming machine 10*a* sends a signal to the signage controller 36 that the progressive game has been activated. After the basic game and bonus game have finished, at step 64, the player is notified that the progressive game has been triggered (as shown in FIG. 5).

In this embodiment, the progressive game is the MONOPOLY ONCE AROUND™ game, which has a board game (e.g., MONOPOLY) theme and is implemented on the game screen 32 and video display 12 of all of the gaming machines 10*a*, 10*b*, 10*c*, 10*d*. The board game defines a plurality of stations or squares about a game board traversable by a game token, or token "identifier" indicating the position of a token, or player. For example, in one embodiment, a token "identifier" comprises an illuminated station of the game screen 32 indicating the position of a token. Hereinafter, references to displaying the position of a token, or player, shall be understood to mean the display of either an actual game token or a token identifier on a game board or portion thereof.

Figure 7:
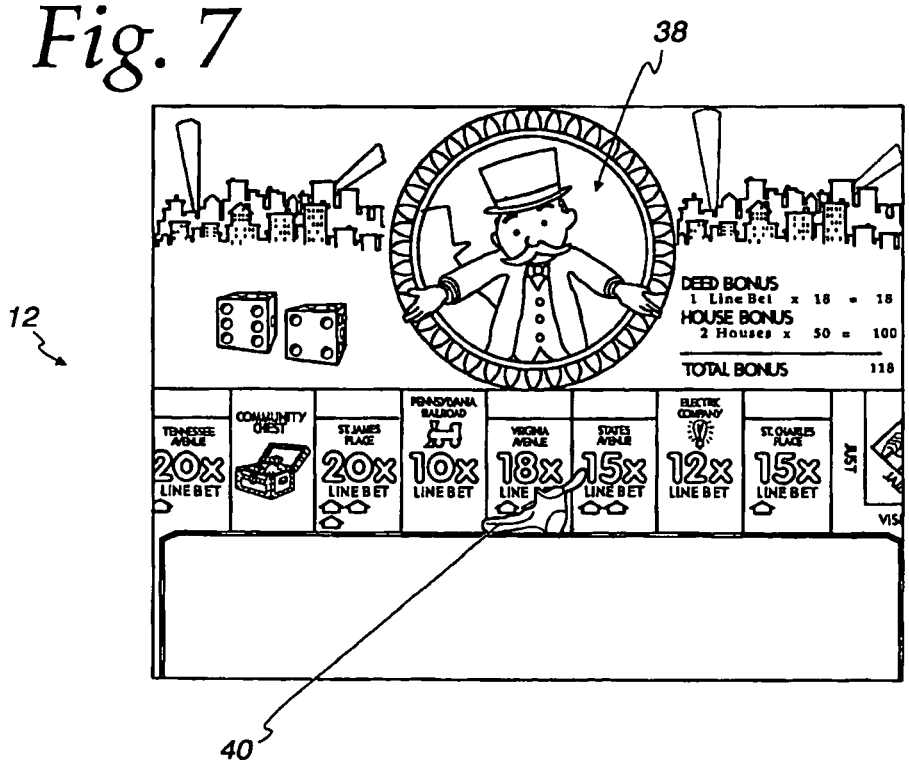
FIG. 7 is an illustration of a progressive game play screen which may appear on the video display of the gaming machines able to make a side wager at step 70 of FIG. 4.
Figure 8:
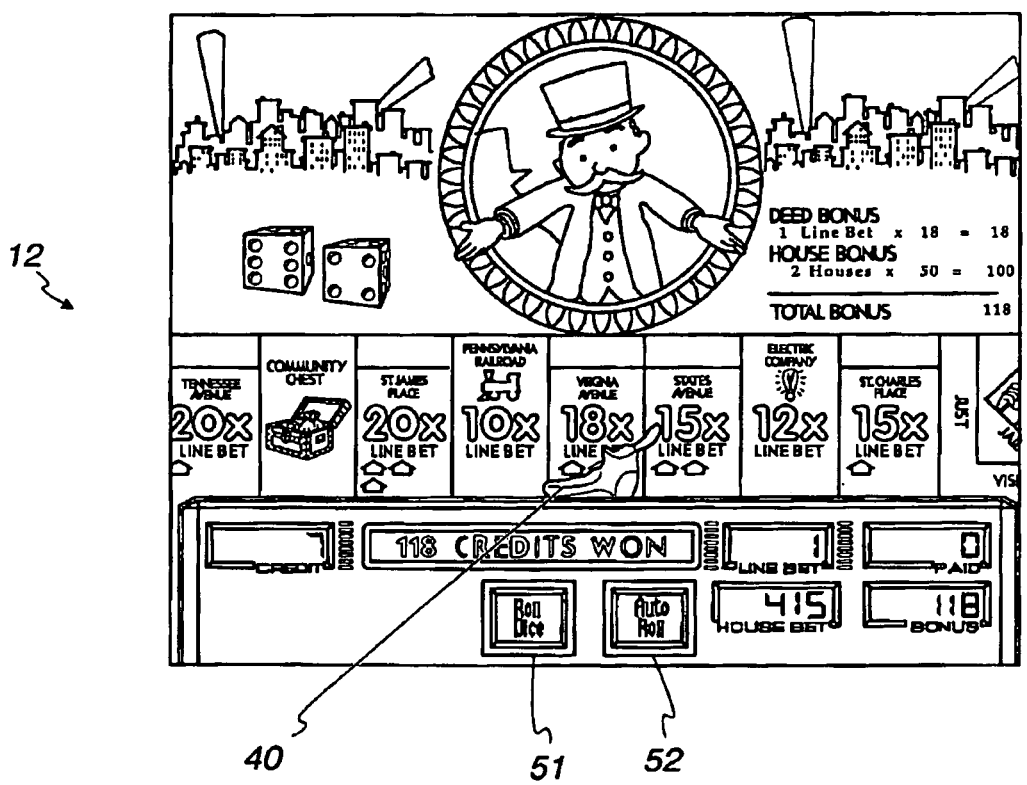
FIG. 8 is an illustration of a progressive game play screen which may appear on the video display of the gaming machine achieving the progressive game and the signage of FIG. 3 at step 70 of FIG. 4.

When the player enters the progressive game at step 64, the video display 12 of the progressive play gaming machine 10*a* instructs the player to select a token 40 (shown as a "SHOE" in FIGS. 7 and 8). In the MONOPOLY ONCE AROUND™ game, a screen may be displayed that shows an animated Rich Uncle Pennybags symbol above a selection of MONOPOLY tokens 40 (e.g., "CAR," "DOG," "HORSE," "SHOE" and "HAT"), and the player is prompted to select one of the game tokens 40. Such a method and others are disclosed in U.S. Pat. No. 6,315,660, which is incorporated herein by reference in its entirety.

Also at step 64, the signage controller 36 sends a side wager inquiry signal that notifies the players at other gaming machines 10*b*, 10*c*, 10*d* in the system 28—hereinafter referred to as the side wager gaming machines 10*b*, 10*c*, 10*d*—that someone is entering the progressive game.

Then, at step 66, a screen is displayed on the video display 12 of the side wager gaming machines 10*b*, 10*c*, 10*d*, giving the other players the opportunity to make side wagers on the stations of the game board which the player predicts will be landed on during the progressive game. The side wagerers are given a particular amount of time (e.g., 30 seconds) to make any side wagers. The time to make a side wager may be counted down by a clock on the display 12 of the side wager gaming machines 10*b*, 10*c*, 10*d*. The increments of the side wagers which may be made on the various stations may be varied according to the game program. For example, in the MONOPOLY ONCE AROUND progressive game, the player has the opportunity to "build" houses (make side wagers) on the properties of the MONOPOLY board which the player predicts will be landed on during the progressive game. The amount of the side wager corresponds to the "cost" of the houses built on the various properties, which generally varies according to the property selected.

Figure 6:
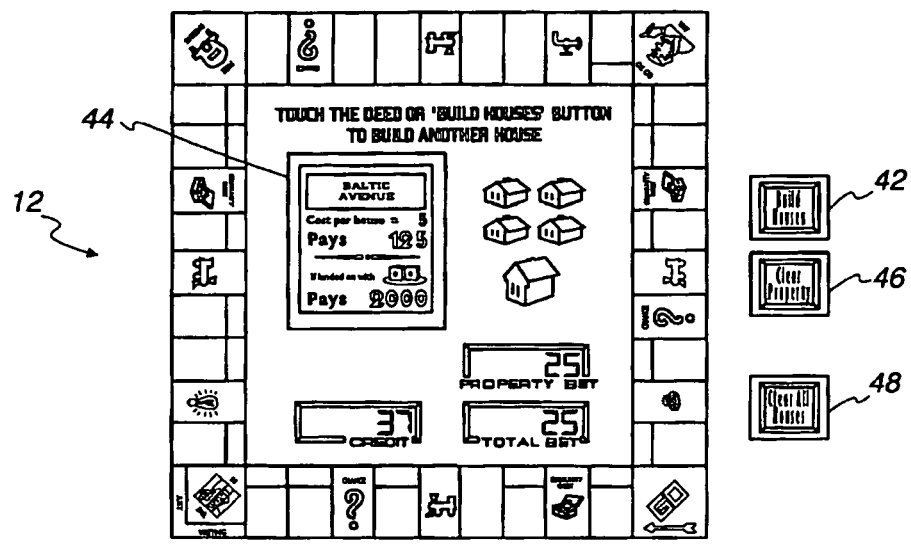
FIG. 6 is an illustration of a "Build Houses" screen which appears on the video display of the gaming machines able to make a side wager at step 66 in FIG. 4.

While still at step 66, and after the selection of a property, the signage controller 36 operates to display a property deed 44 (FIG. 6) corresponding to the selected property on the video display 12 of whichever side wager gaming machine 10*b*, 10*c*, 10*d* that is making the wager. In FIG. 6, the property deed shown on the video display 12 of the side wager gaming machines 10*b*, 10*c*, 10*d* is "Baltic Avenue," thus indicating that the player has elected to build houses on Baltic Avenue. More specifically, the player has identified the "Baltic Avenue" station as a predicted landing position of the token 40. The player builds houses on the selected property by any number of methods, including touching the deed 44 or touching a specific key 42. The cost of the houses may vary depending on the property, such as disclosed in U.S. Pat. No. 6,315,660, which was incorporated by reference above.

While still at step 66, the cost of the houses is subtracted from the credits previously earned or paid into the side wager gaming machine 10*b*, 10*c*, 10*d* by the player. In one embodiment, the player may insert coins or bills into the side wager gaming machine 10*b*, 10*c*, 10*d* at any time during display of the screen shown in FIG. 6 to increase the credits available for building houses. Various keys 46, 48 are provided to allow the players to clear their side wagers should they desire to do so before the beginning of the progressive game. Once the side wagers are made, a side wager response signal is transmitted from the side wager gaming machine 10*b*, 10*c*, 10*d* to the signage controller 36 indicating that the side wager has been made.

Also occurring at step 66, the video display 12 displays a number of house and hotel icons corresponding to the number of houses built on each selected property. In FIG. 6, for example, the video display 12 shows four green house icons and a red hotel icon represents the fifth wager placed on Baltic Avenue. The displayed property deed 44 identifies the cost per house (e.g., credits for Baltic Avenue) and the pay value of landing on the property (e.g., 125 credits for Baltic Avenue, with five houses).

At step 68, once the player of the progressive play gaming machine 10*a* (FIG. 3) selects a token 40 and all side wagers have been placed, the signage controller 36 displays a portion of the game board on the video display 12 of all of the gaming machines 10*a*, 10*b*, 10*c*, 10*d* with the selected token 40 on a starting station of the game board. The signage controller 36 also illuminates the starting station on the game screen 32. For example, in the MONOPOLY ONCE AROUND™ game, the starting station is the "GO" square. The signage controller 36 then randomly selects an integer movement value defining a number of stations or steps which the token 40 is to be moved from the GO square.

In one embodiment, the player "rolls" a pair of dice 49 (FIG. 3) by touching a "Roll Dice" key 50 or "Auto Roll" key 52 on the video display 12 of the progressive play gaming machine 10*a*. At step 70, token 40 (FIGS. 7 and 8) is advanced across the game board according to the roll of the dice. On the game screen 32 (FIG. 3), movement is illustrated by the illumination, in step-wise fashion, of the appropriate stations (squares) on the game board (e.g., MONOPOLY board) from the previous position to the position determined by the roll of dice. On the video display 12 of the gaming machines 10*a*, 10*b*, 10*c*, 10*d*, movement is illustrated by the selected game token (e.g., "SHOE") moving, one space at a time, a corresponding number of spaces on a scrolling portion of the game board. The landing of the token 40 on a particular square or station of the game board constitutes an event in the progressive game.

At step 72, after each roll, the player of the progressive game machine 10*a* is awarded a point amount that corresponds to the square. In the MONOPOLY ONCE AROUND™ game, if the token 40 lands on a "Chance" or "Community Chest" station (square) during the progressive game, the player playing the progressive game receives an award of a fixed number of points (e.g., "BANK ERROR IN YOUR FAVOR, 100 points), or they can move the player to a new space (e.g., GO BACK THREE SPACES). If the token 40 lands on a property, various points are awarded to the player. In some embodiments, the points awarded may be dependent on the value of the property, as described in U.S. Pat. No. 6,315,660.

Then, at step 72, the signage controller 36 compares the event to the position(s) wagered on by the side wager gaming machines 10*b*, 10*c*, 10*d* and, if the event matches any of the position(s) wagered on, the player who made the side wager is paid an amount of coins or credits, as appropriate, corresponding to the cost of building the house(s) on that property.

Next, at step 74, the signage controller 36 determines if the player has moved once around the entire board. If the answer is "no," the program returns to step 68 and the dice is rolled, creating a new event. If the answer is "yes," then the progressive game has ended and the program moves to step 76 and awards credits to the player of the progressive game.

In a preferred embodiment, at step 76, the payout amount that the progressive game player wins is dependent upon the amount of points that were earned. In some embodiments, the progressive game may comprise multiple jackpots of varying amounts. The more points that the player accumulates during the game, the more credits or money that is paid to the player at the end. As shown in FIG. 3, the gaming system 28 has three payouts, or levels: a mini progressive, a maxi progressive, and a mega progressive. The mini progressive pays out when a player earns between 0 and 499 points during the progressive game, the maxi progressive pays out to players who have earned between 500 and 999 points, and the mega progressive only pays out to players who earn more than 1000 points during the progressive game.

Once one of the levels of a progressive game has been paid out, that level resets itself to the base amount. The other progressives that did not pay out keep increasing until someone wins that progressive jackpot. The progressive jackpots are created by a base amount being put into the pot (e.g., $1,000 for the mini, $3,000 for the maxi, and $5,000 for the mega). Then, every time one of the gaming machines 10*a*, 10*b*, 10*c*, 10*d* in the system 28 is played, a percentage of the amount wagered is placed into each of the progressives. In some embodiments, 1% may go to the mini progressive, ½% to the maxi progressive, and ¼% to the mega progressive. Because the maxi progressive and the mega progressive payouts less often than the mini progressive, less money needs to go to fund these progressives.

After the credits are all awarded and the progressive has been reset, the program goes back to step 60, with a player playing the maximum number of paylines on the machine.

In another embodiment, the present invention may operate to allow other players to make side wagers when one player has reached any special gaming session. The special gaming session is any game other than the basic game depicted in FIG. 1. For example, the special gaming session may be a bonus game or a progressive game.

In some embodiments, only the side wager gaming machine 10b, 10c, 10d displays the wager made. A screen displaying the game board may appear on the machine with houses placed on the property on which the player wagered. In other embodiments, the side wagers may be displayed on the game screen 32, with different color houses representing the different players. In either embodiment, multiple players can place side wagers on the same property. For example, two different players can each place five houses on Baltic Avenue.

In an alternative embodiment, the person playing the progressive game can also make side wagers on the various events of the game. The progressive play gaming machine 10a would then perform all of the functions described above with respect to the side wager gaming machines 10b, 10c, 10d. The display 12 in FIG. 8 would then also depict the side wagers placed by the person playing the progressive gaming machine 10a.

In some embodiments, the amount of points awarded for the "Chance" or "Community Chest" cards is dependent on the amount wagered by the player per each payline in the basic game. A player who wagered the minimum amount per each payline will receive fewer points than a player who wagers the maximum amount per each payline, even if they draw the same card. For example, the card "Grand Opera Opening" has a payout of 9 credits. In this embodiment, that may be the payout for someone who wagered 1 out of a possible 5 credits. For someone who wagered 5 credits, the payout may be 45 credits. Also, the card marked "Go Back Three Spaces" may have multiple space numbers depending on the amount wagered. For example, if only 1 credit is wagered, the card may read "Go Back Two Spaces," but if the player wagered the maximum amount, the card may read "Go Back Five Spaces," thus giving that player more chances to land on property and earn more points.

In another alternative embodiment, the side wager gaming machines 10b, 10c, 10d are offered the chance to place a wager on what the outcome of the progressive game will be. In other words, the side wager gaming machines 10b, 10c, 10d can send a side wager response signal placing a wager on whether the player of the progressive play gaming machine 10a will win the mini jackpot, the maxi jackpot, or the mega jackpot. The side wager gaming machines 10b, 10c, 10d will be credited as described above if the predicted outcome matches the outcome of the progressive game.

In another alternative embodiment, at step 62 in FIG. 4, it is the signage controller 36, not the CPU 16, that randomly starts the progressive game. In this embodiment, the signage controller 36 sends a signal to the CPU 16 of the next gaming machine 10 that places a wager that the progressive game has been triggered. The rest of the game proceeds as described above.

Figure 9:
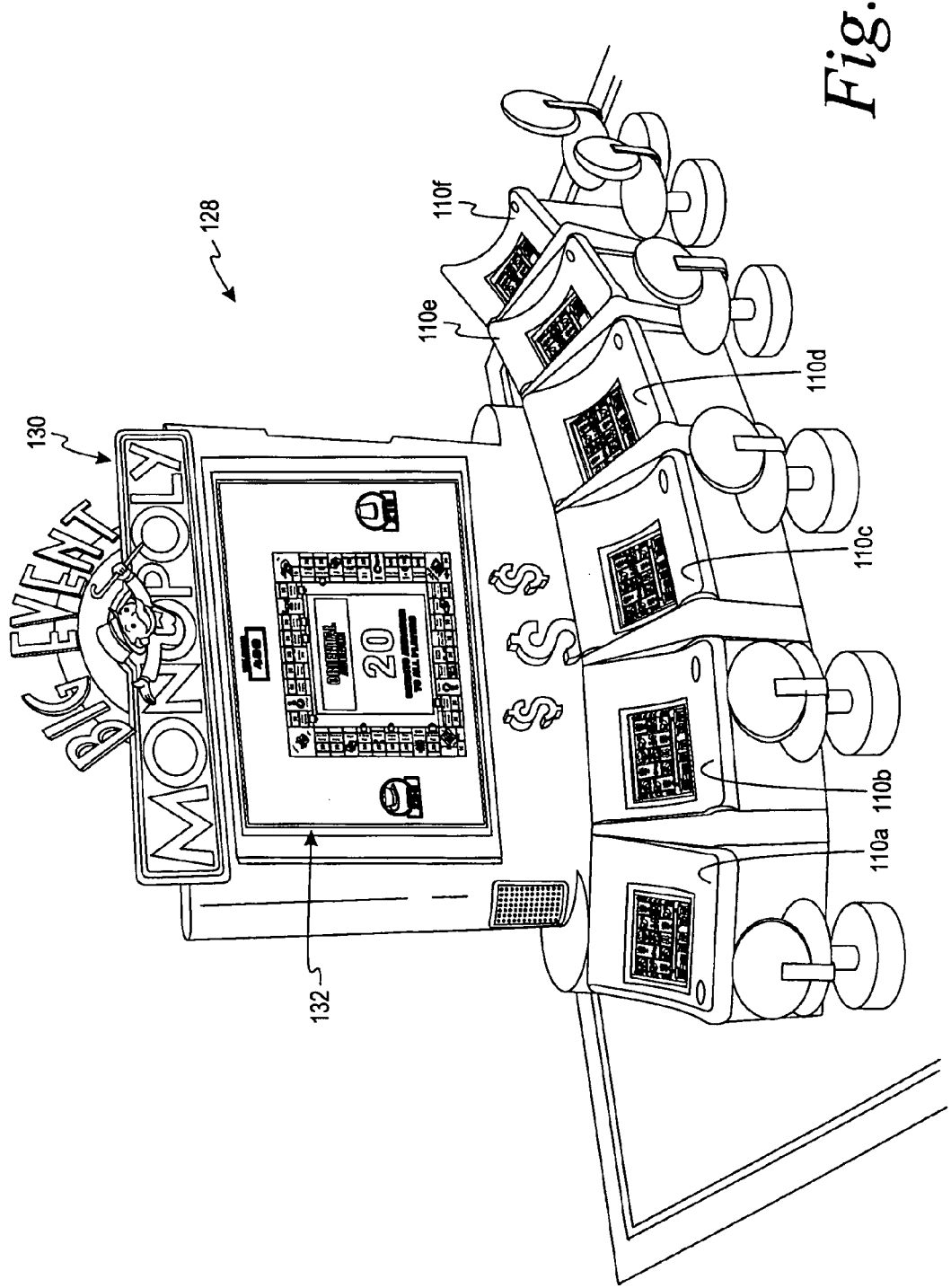
FIG. 9 is an illustration of a gaming system of interconnected gaming machines and signage, according to one embodiment.

Referring now to FIG. 9, a gaming system 128 comprising a bank of gaming machines 110a-f is illustrated in accord with one embodiment of the present invention. The gaming machines 110a-f may be of the type described above with respect to FIGS. 1-2 or any other type of gaming machine suitable for operating a wagering game. The gaming machines 110a-f are interconnected and included under signage 130. The signage 130 includes a community display 132 for displaying a community event thereon. According to one embodiment, the community display 132 is one or more plasma displays visible to each player seated at the bank of gaming machines 110a-f.

The signage 130 includes a signage controller (not shown) similar in operation to the signage controller 36 described above with respect to FIG. 3. The signage controller is connected to one or more of the gaming machines 10a-f and transmits information to and receives information from the CPU (FIG. 2) in one or more of the gaming machines 110a-f throughout the wagering game. The gaming system 128 allows for various aspects of the gaming machines 110a-f, such as playing communal games, to be controlled through the signage controller in the signage 130.

According to one embodiment, a community event includes a plurality of elements displayed on the community display 132. One or more of the plurality of elements has a communal value associated therewith. The communal value represents the base award provided to a player participating in the community event when a particular element is earned. As will be discussed below with respect to FIGS. 11a-c, the communal value may be increased for each player participating in the community event based on the value-enhancement parameter that has been earned by the individual player. The community event may be, for example, a MONOPOLY ONCE AROUND™ game, a different MONOPOLY® game, or any other type of communal game.

The community event may be initiated by achieving a winning combination of symbols on any of the gaming machines 110a-f within the bank or by the signage controller independent of the symbols appearing on the gaming machines 110a-f. Once a community event has been initiated, a plurality of players at the bank of gaming machines 110a-f are selected to participate in a communal wagering game. According to one embodiment, the players are selected based on their time eligibility as determined by their recent wager history.

Time eligibility is measured using, for example, a time slice, which is the amount of time that a wagered amount gives eligibility to the player for entry into the communal wagering game. A time-slice counter is used to increment and/or decrement time slices for increasing and/or decreasing the time that the player is eligible to participate in the communal wagering game. If the player has eligibility during an increment of time when the community event is triggered, then the player is allowed to play the communal wagering game. The player may also be provided with a value-enhancement parameter within the communal wagering game based on the player's betting history, as will be discussed below with respect to FIGS. 11a-c. The value-enhancement parameter may include a plurality of levels that can be earned by the player by wagering on the basic wagering game. Each level has a certain maximum number of purchasable time slices.

FIGS. 10-13b illustrate various aspects of a communal bonus game operable on the above-described gaming system 128. In the illustrated embodiments, a MONOPOLY ONCE AROUND™ game is used as an example of one type of communal game that may incorporate the various aspects of the present invention. However, it should be noted that other game types, styles, and features may be utilized in accordance with the present invention.

Figure 10:
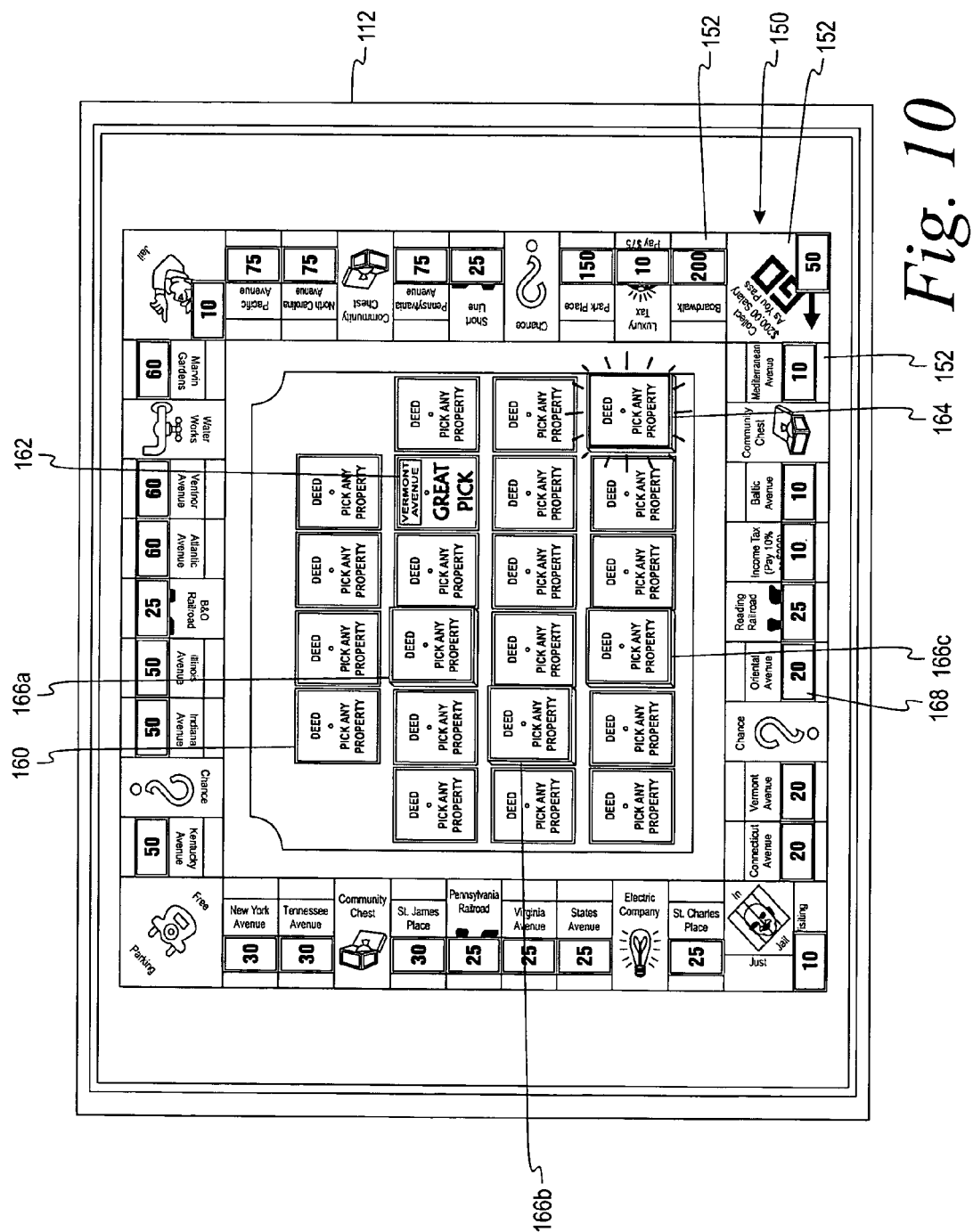
FIG. 10 is an illustration of a deed selection screen, according to one embodiment of the present invention.

Referring now to FIG. 10, a plurality of elements (e.g., a plurality of stations 152) are displayed on the video display 112. In the illustrated embodiment, the stations 152 are aligned to form a trail 150. Once a plurality of players have been selected to participate in the communal wagering game, each player is provided an opportunity to select a plurality of deeds 160 (e.g., up to 5) that represent individual stations 152 along the trail 150. As illustrated in FIG. 10, the player has selected a first deed 162 that represents "VERMONT AVENUE."

The various deeds 160 are arranged so as to allow the player to select the deeds 160 by utilizing the touch screen input keys 17 (FIG. 2) or other input means. In some embodiments, the player is given a predetermined length of time to select the required number of deeds 160. If the player fails to select the required amount of deeds 160 in the allotted period of time, the gaming system 128 automatically selects the remaining number of deeds 160 for the player.

One method to facilitate automatic selection is to indicate to a player which of the deeds 160 will be selected for the player once the time expires. For example, in the illustrated embodiment, deeds 166a, 166b, and 166c are slightly raised from the other deeds 160. The raised deeds 166a-c indicate to a player that these deeds 166a-c will be selected by the gaming system 128 for the player if the player does not choose otherwise. In addition to the raised deeds 166a-c, a highlighted, raised deed 164 may also be provided to indicate that the next player selection will void the automatic selection of the highlighted, raised deed 164 by the gaming system 128.

Thus, for embodiments where five deed selections are required, five deeds among the plurality of deeds will be randomly selected and raised by the gaming system 128, with one of the raised deeds being highlighted. Once a player chooses a first deed, the highlighted, raised deed will be lowered and one of the remaining four raised deeds will become the highlighted, raised deed. This process will continue until all five deeds are selected by the player or the predetermined time period has expired—at which time the remaining raised deeds will be automatically selected for the player.

One or more of the stations 152 has a communal value 168 associated therewith. When a deed 160 representing a particular one of the stations 152 is selected, the communal value 168 for that particular station 152 is increased for the player that selected the deed 160. Thus, the selection of one or more deeds allows a player to increase the award value of a particular station 152 if the station 152 is earned during the communal wagering game.

Figure 11A:
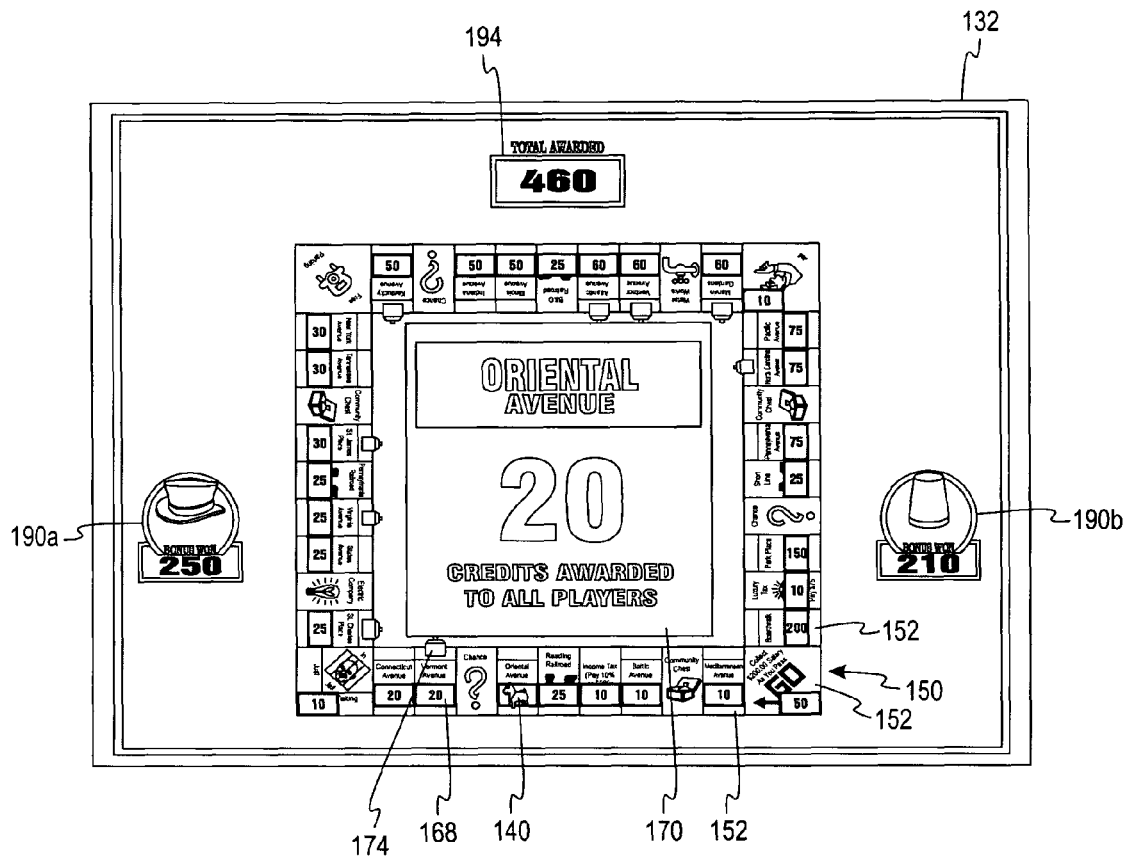
FIG. 11a is an illustration of a communal display, according to one embodiment of the present invention.
Figure 11B:
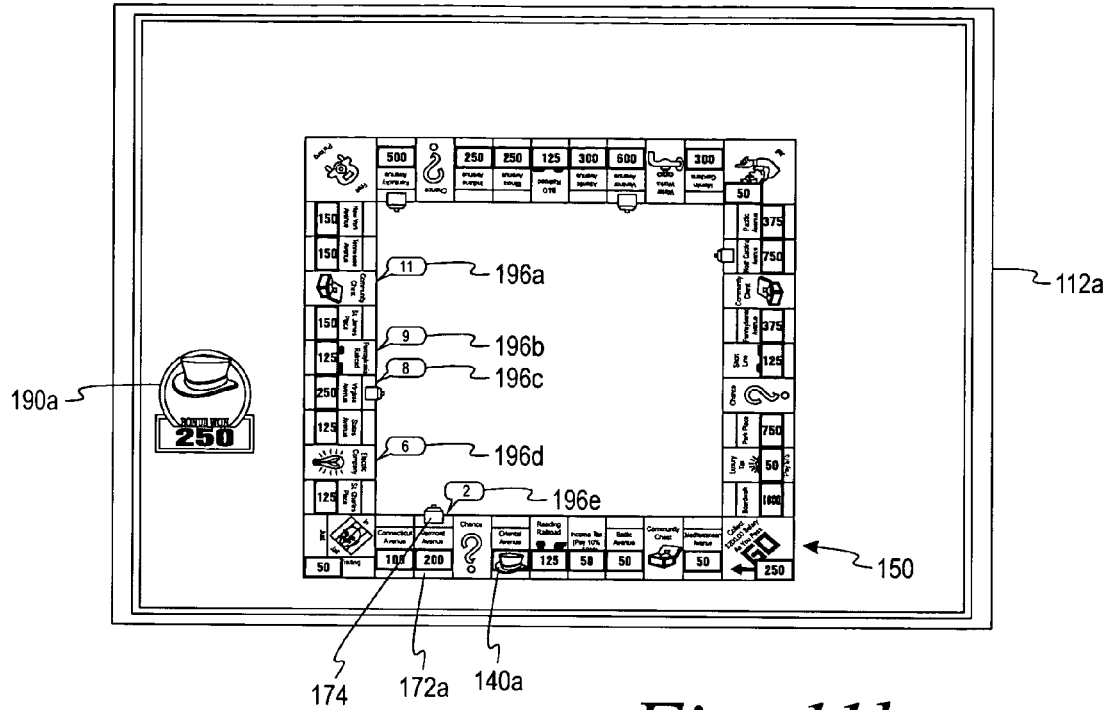
FIG. 11b is an illustration of a first individual game screen displayed on a video display while the communal game screen is displayed on a community display, according to one embodiment of the present invention.
Figure 11C:
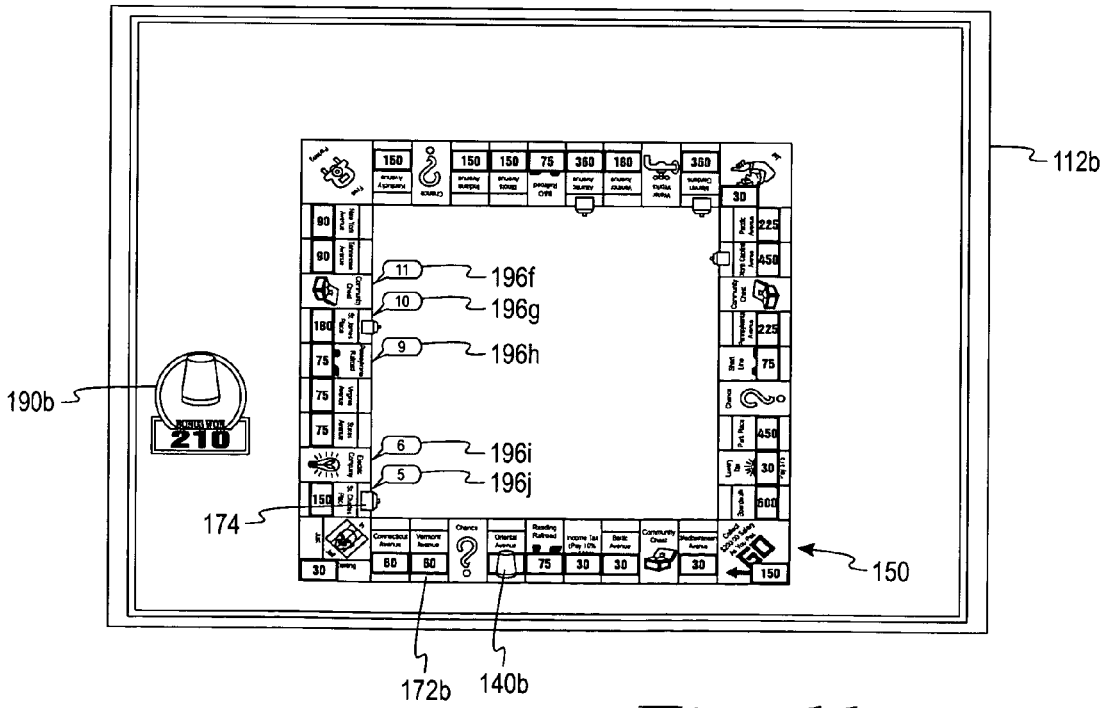
FIG. 11c is an illustration of a second individual game screen displayed on a video display while the communal game screen is displayed on a community display, according to one embodiment of the present invention.

Referring also to FIGS. 11a-c, another method for enhancing, and displaying the enhanced, award values is illustrated, according to one embodiment of the present invention. FIG. 11b illustrates a community display 132 for displaying the above-described communal wagering game. The community display 132 displays the trail 150 as well as the communal values 168 associated with one or more of the plurality of stations 152. The communal values 168 vary for the plurality of different stations 152 included within the trail 150.

As discussed above, when the community event is initiated, a determination is made as to which players at the plurality of gaming machines 110a-f are eligible to participate in the communal wagering game. A determination is also made as to whether to apply a value-enhancement parameter to the player's gaming machine and if so, what the value of the parameter will be. For example, in one embodiment the player's betting history prior to the initiation of the bonus event will determine the value of the player's value-enhancing parameter. In other embodiments, the length of the gaming session, total credits wagered, speed of play, credits earned, etc. can be used to determine the player's value-enhancing parameter.

The value-enhancing parameter enhances the communal values 168 associated with the stations 152 to arrive at a player value for the stations 152. The value-enhancing parameter can be, for example, a multiplier that is applied to each of the communal values 168 to increase the communal values 168 by the particular multiplier value (e.g., 1×, 2×, 3×). According to other embodiments, the value-enhancing parameter is a predetermined amount or selected from a predetermined range of amounts.

As illustrated in FIGS. 11b-c, the player values 172a, 172b are increased based on the determined value-enhancement parameter for each player. As illustrated in FIG. 11b, the value-enhancement parameter is a 5× multiplier and the first player values 172a displayed on the first video display 112a are five times greater than the communal values 168 displayed on the community display 132 in FIG. 11a. Similarly, in FIG. 11c the value-enhancement parameter is a 3× multiplier and the second player values 172b displayed on the second video display 112b are three times greater than the standard communal values 168.

In addition to the value-enhancement parameters increasing the communal values 168, a plurality of markers 174 (e.g. hotels) are utilized to designate the stations 152 for which deeds 160 were previously selected by the player. The player values 172a, 172b for those stations 152 for which the player selected a deed 160 (FIG. 10) are further increased. In the illustrated example, the selection of a deed 160, as described with respect to FIG. 10, results in a 2× multiplier being applied to the communal value 168 for the selected properties. This 2× multiplier is in addition to the value-enhancing parameters that were previously applied to the communal values 168, and creates an added-value station along the trail 150. Each of the stations 152 designated with a marker 174 are referred to as added-value stations.

As discussed above with respect to FIG. 4, in the MONOPOLY ONCE AROUND™ game, a game token 140 begins at a first station along a trail, such as the GO station on a MONOPOLY® board. The signage controller randomly generates a length of advancement (e.g., a number of spaces) that the token 140 will move along the trail 150. The signage controller continues to randomly generate lengths of advancement until the token 140 has completed a single circuit around the trail 150 so as to pass the GO station.

As illustrated in FIGS. 11a, the token 140 has advanced to "ORIENTAL AVENUE" and the associated payout deed 170 is displayed to the player on the community display 132. The payout deed 170 displays the communal value 168 for the particular station 152 to the players, while each player is awarded their respective player values 172a, 172b for the station 152. Once the player values 172a, 172b have been awarded, the controller generates another length of advancement and the token 140 moves further along the trail 150. It should be noted that each player participating in the communal wagering game may be prompted to select an individualized token 140a, 140b (FIGS. 11b-c) that is displayed on the first and second video displays 112a, 112b, respectively.

The individualized tokens 140a, 140b may also be utilized to represent the player on the community display 132. For example, the community display may include a plurality of player-award meters 190a; 190b used to display the award accrued by the individual players. The player-award meters 190a, 190b are also displayed on the first and second video displays 112a, 112b respectively. A communal-award meter 194 for displaying the total award provided during the communal wagering game is also provided on the community display 132. The communal-award meter 194 displays the overall value of the awards that have been earned by the players over the course of the communal wagering game.

The first and second video displays 112a, 112b include a plurality of advancement identifiers 196a-j indicating the number of stations 152 the token 140 must advance to "land on" the indicated station 152. For example, the first video display 112a has advancement identifiers 196a-e identifying various stations 152 along the trail 150.

According to one embodiment, the advancement indicators 196a-j identify all of the marked properties and all of the special-event properties (as will be discussed with respect to FIGS. 12-13b below) reachable within the next length of advancement, which, in the illustrated example, is twelve stations (e.g., one roll of two dice). The advancement indicators 196a-j may assist in allowing a player to quickly identify what length of advancement they desire on the next "roll."

Figure 12:
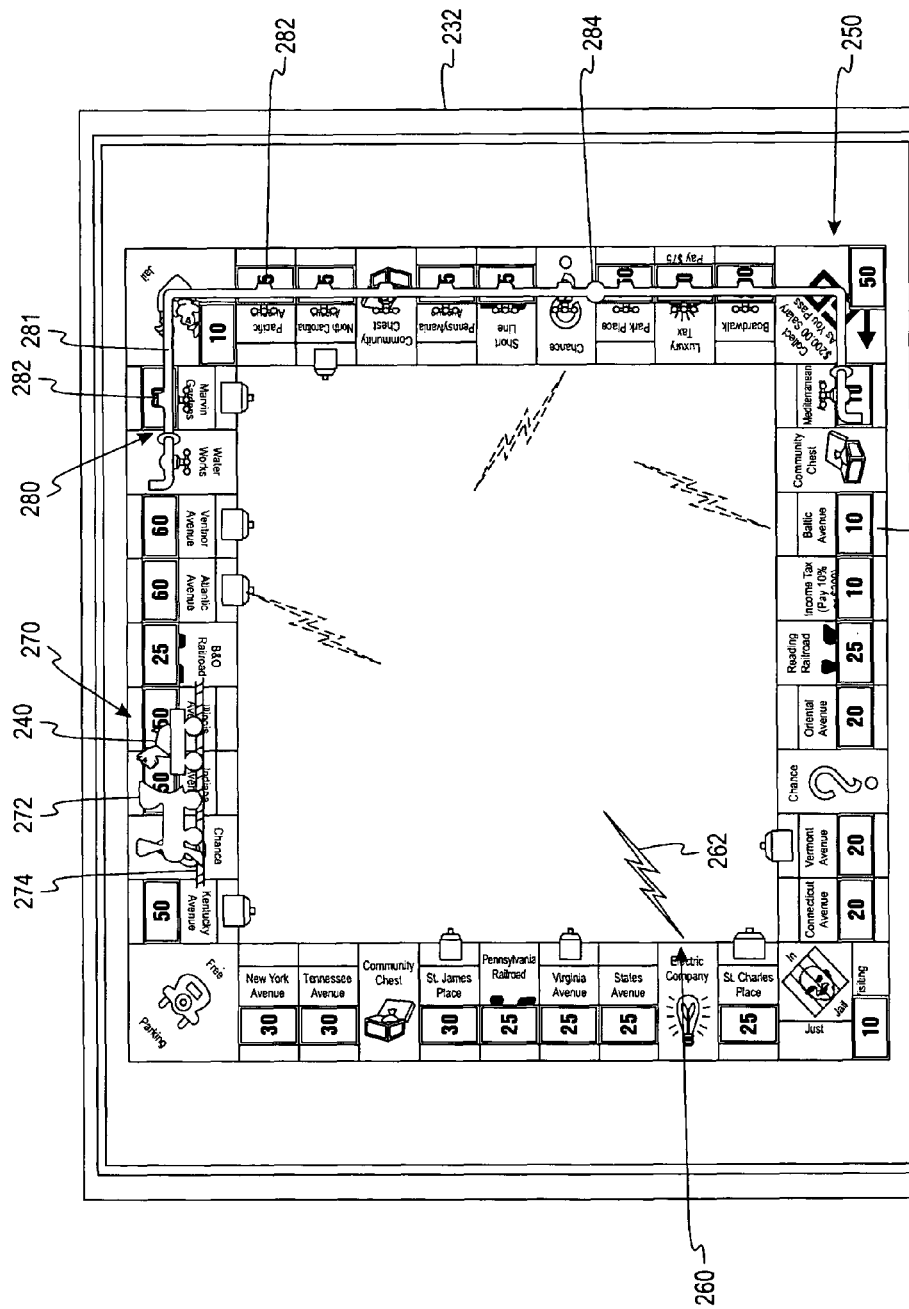
FIG. 12 is an illustration of a special-event game screen, according to one embodiment of the present invention.
Figure 13A:
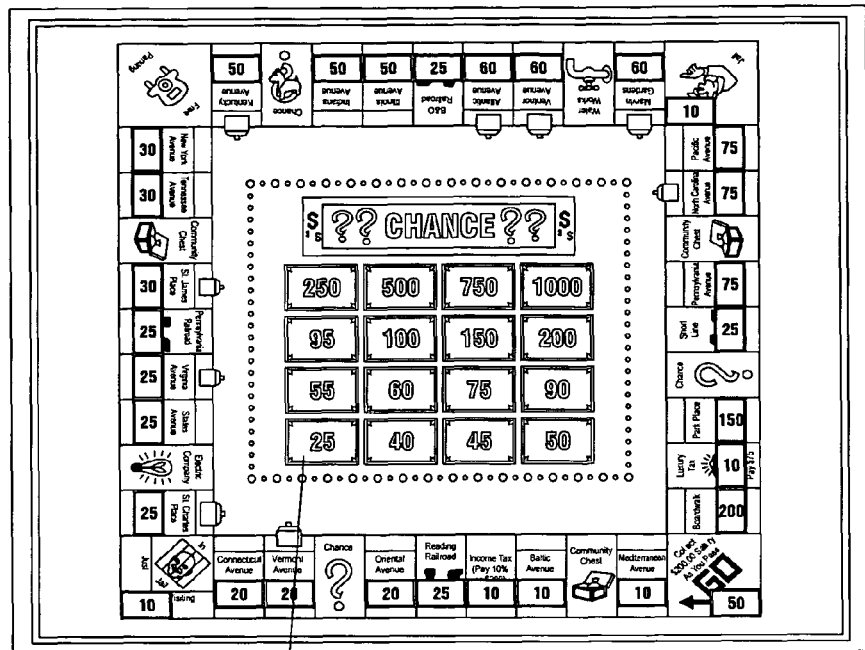
FIG. 13a is an illustration of an elimination-type game displayed on a community display, according to one embodiment of the present invention.
Figure 13B:
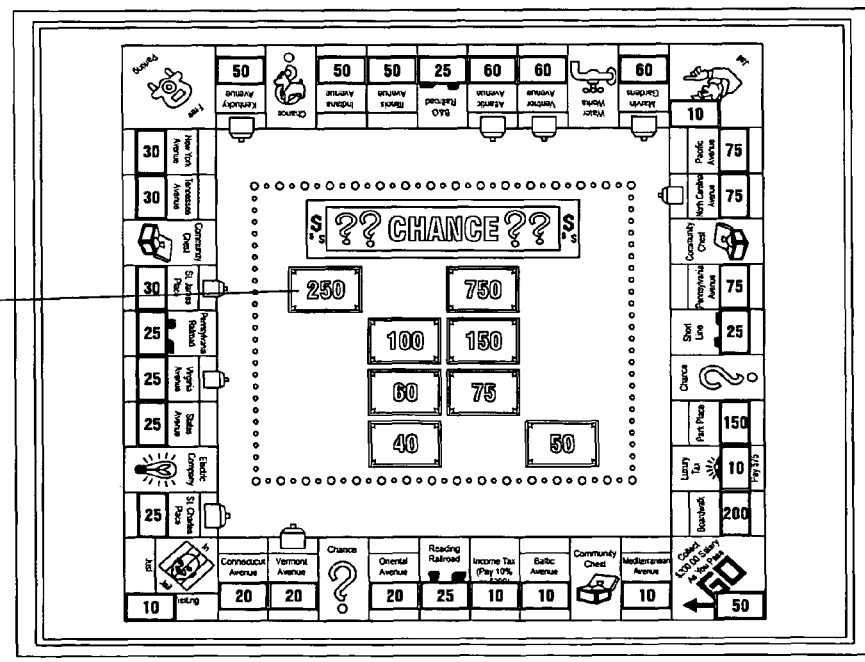
FIG. 13b is an illustration of the elimination-type game of FIG. 13a after several of a plurality of value-bearing symbols have been removed.

Turning now to FIGS. 12-13b, a plurality of special-feature elements will be detailed with respect to various embodiments of the present invention. FIG. 12 illustrates special-feature elements that award the participating players in the communal wagering game an award that is not associated with the special-feature element itself. When a special-feature element is achieved, a special-feature event is initiated and displayed on a community display 232.

For example, when a first special feature 260 is initiated (e.g., the "ELECTRIC COMPANY" feature), a station designator 262 appears within the trail 250. The station designator 262 moves around internal portion of the trail 250 pointing from station 252 to station 252 until finally selecting one of the other stations 252 along the trail 250. Once a station 252 has been selected by the first special feature 260, the player values associated with that station 252 are awarded to the individual players. In some embodiments, the player values are further increased when a special feature is initiated. For example, the first special feature 260 can apply an additional multiplier (e.g., a 2× multiplier) to the communal values 168 (FIG. 11a) and award the resulting player values.

A second special feature 270 (e.g., the "railroad" feature) can also be initiated. When a token 240 lands on a second special-feature element the second special feature 270 is initiated. The initiation of the second special feature 270 causes a locomotive 272 positioned on a railroad track 274 to be displayed on the community display 232. The locomotive 272 moves along the railroad track 274 and transports the token 240 back along the trail 250. The locomotive 272 eventually stops and the token 240 is "dropped off" at the station 252 where the locomotive 272 stops. The players are then awarded their individual player values associated with the station 252.

In addition, a third special feature 280 (e.g., the "WATER WORKS" feature) can also be initiated. The initiation of the third special feature 280 causes a pipe 281 to form over a plurality of stations 252. The pipe 281 includes a valve 282 located at each station 252. A bulge 284 in the pipe 281 indicates where the token 240 is moving within the pipe 281. The bulge 284 continues to move along the pipe 281 until one of the valves 282 opens and the token 240 is released at a particular station 252. The players are then awarded their individual player values associated with the station 252.

In both the second special feature 270 and the third special feature 280 the token 240 is actually moved along the trail 250, while in the first special feature 260, the token 240 remains stationary and only the station designator 262 moves. In some embodiments, the second special feature 270 and the third special feature 280 are capable of moving the token 240 anywhere along the trail 250 in either direction. In other embodiments, however, the second special feature 270 and the third special feature 280 are limited in the range and/or direction they can move the token. For example, in some embodiments, the second special feature 270 can only move the token 240 back in the direction from which it came and only regress the token 240 five or less stations 252. In some embodiments, the third special feature 280 can only advance the token 240 and only for up to twelve stations 252 (e.g., one roll of the dice).

Referring also to FIGS. 13a-b, a fourth special feature is displayed on a community display 332. The fourth special feature is an elimination-type feature that includes a plurality of value-bearing symbols 350 displayed on the community display 332, as illustrated in FIG. 13a. The value-bearing symbols 350 are removed one at a time—as illustrated in FIG. 13b—until only a single value-bearing symbol 350 remains. The value associated with the single remaining value-bearing symbol 350 is then awarded to each of the players participating in the communal wagering game. The value associated with the single remaining value-bearing symbol 350 may be enhanced by the value-enhancement parameters as discussed above. In some embodiments of the present invention, the elimination-type feature is initiated when the token 140 (FIG. 11a) advances to "CHANCE," "COMMUNITY CHEST," or "FREE PARKING." The values associated with the plurality of value-bearing symbols 350 may vary depending on which of the stations initiates the feature.

As discussed above, the community event may be, for example, a MONOPOLY ONCE AROUND™ game, a different MONOPOLY® game, or any other type of communal game. Additionally, one or more of the above described special features within the MONOPOLY ONCE AROUND game may be independent community events. In alternative embodiments, one or more of the special features are both events within the MONOPOLY ONCE AROUND™ game as well as being independent community events.

The community event may be triggered by achieving a winning combination of symbols on any of the gaming machines 110a-f (FIG. 9) within the bank or by the signage controller independent of the symbols appearing on the gaming machines 110a-f. Additionally, or alternatively, the signage controller 36 (FIG. 3), or CPU 16 (FIG. 2) may randomly trigger a community bonus event.

Once a community bonus event has been triggered, the signage controller 36, CPU 16, or other controller randomly selects one of the plurality of independent community events to initiate. The randomly selected community event is then displayed on the community display 132 and a plurality of players at the bank of gaming machines 110a-f are selected (e.g., by time eligibility) to participate in the randomly selected communal wagering game. Alternatively, the community event may be selected based on the particular winning combination of symbols achieved during play of the basic wagering game.

According to one embodiment, the plurality of community events includes the MONOPOLY ONCE AROUND™ game and one or more of the above-described special features as independent community events. According to still other embodiments, the plurality of community events includes the MONOPOLY ONCE AROUND™ game, one or more of the above-described special features as independent community events, additional community events as will be described below, or any combination thereof.

Figure 14:
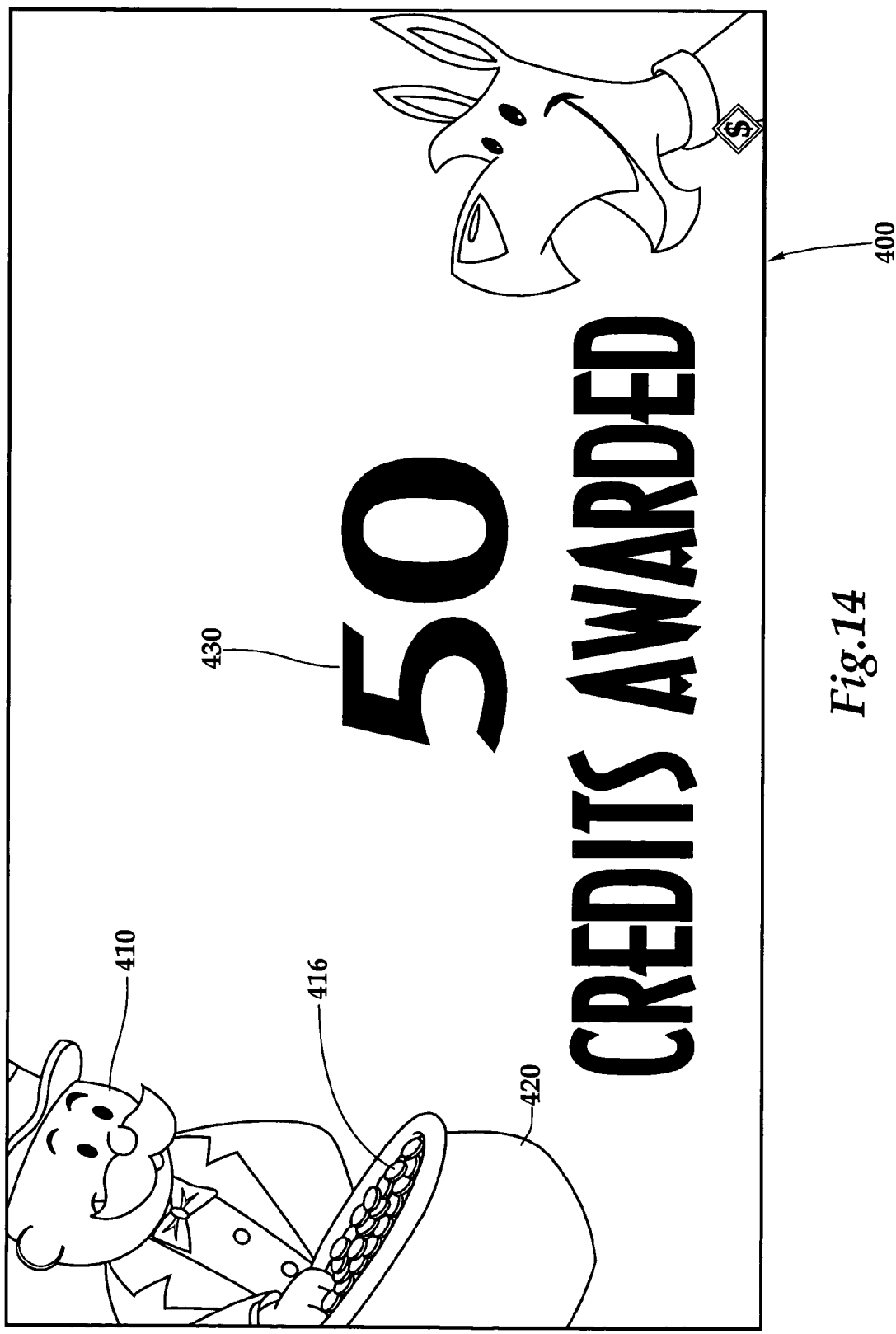
FIG. 14 is an illustration of an increasing-award community event adapted to be displayed on a community display, according to one embodiment of the present invention.

According to one particular embodiment of the present invention, the plurality of community events includes: (1)

the MONOPOLY ONCE AROUND™ game (FIGS. 10-13b); (2) a "CHANCE" elimination-type community event (similar to the elimination-type feature illustrated in FIGS. 13a-b); (3) a "COMMUNITY CHEST" elimination-type community event (similar to the elimination-type feature illustrated in FIGS. 13a-b); (4) a "MR. MONOPOLY" community event (FIG. 14); (5) a "RAILROAD RICHES" community event (FIGS. 15a-b); and (6) a "FREE PARKING" community event (FIGS. 16a-c). In this embodiment, the signage controller 36, CPU 16, or other controller randomly selects one of the six independent community events to initiate.

The individual community events may be weighted differently such that one or more of the community events are more likely to be initiated than another one of the community events. For example, the MR. MONOPOLY community event may be weighted differently than the MONOPOLY ONCE AROUND™ game such that the MR. MONOPOLY game is randomly selected more often (e.g., three times more often) than the MONOPOLY ONCE AROUND™ game. Alternatively, the individual community events may be configured such that each of the community events is initiated approximately the same number of times as each of the other community events over time.

Turning now to FIG. 14, according to one embodiment, an increasing-award community event 400 adapted to be displayed on a community display (e.g., community display 132 illustrated in FIG. 9) is illustrated. In the illustrated embodiment, the increasing-award community event 400 is a "MR. MONOPOLY" community event.

When the MR. MONOPOLY community event is initiated, MR. MONOPOLY 410 appears on the community display (e.g., community display 132 in FIG. 9) and begins ladling gold coins 416 out of a pot 420 while a credit prize 430 increases. The credit prize 430 continues to increase until MR. MONOPOLY 410 stops ladling coins 416 from the pot 420. After the credit prize 430 has been increased and the ladling stops, the credit prize 430 is awarded to each of the players participating in the community event. In some embodiments, the credit prize 430 is increased by a player's value-enhancement parameter earned by playing the basic wagering game, as described above with respect to FIGS. 11a-c.

Figure 15A:
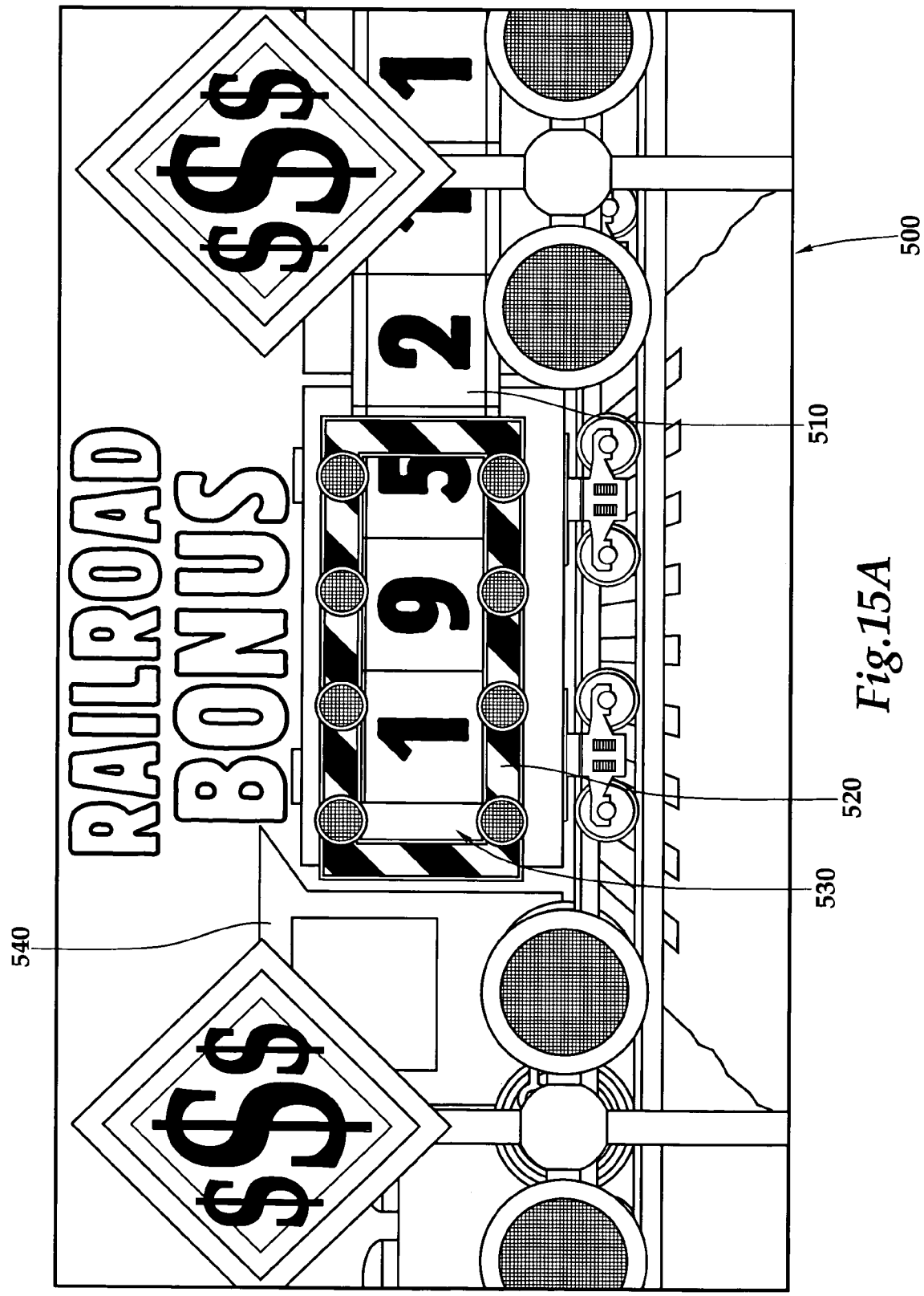
FIG. 15a is an illustration of a value-selector community event adapted to be displayed on a community display, according to one embodiment of the present invention.
Figure 15B:
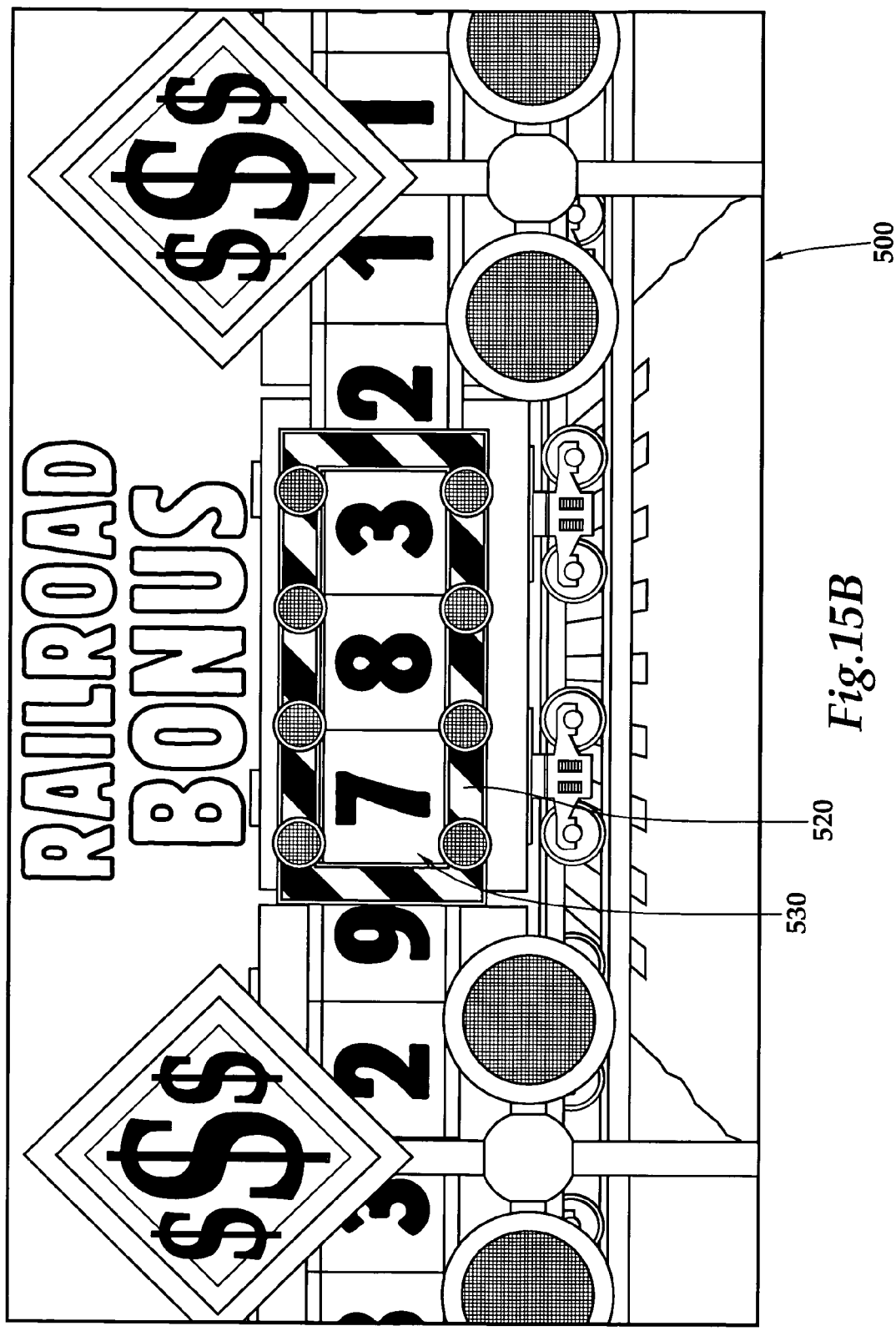
Figure 16A:
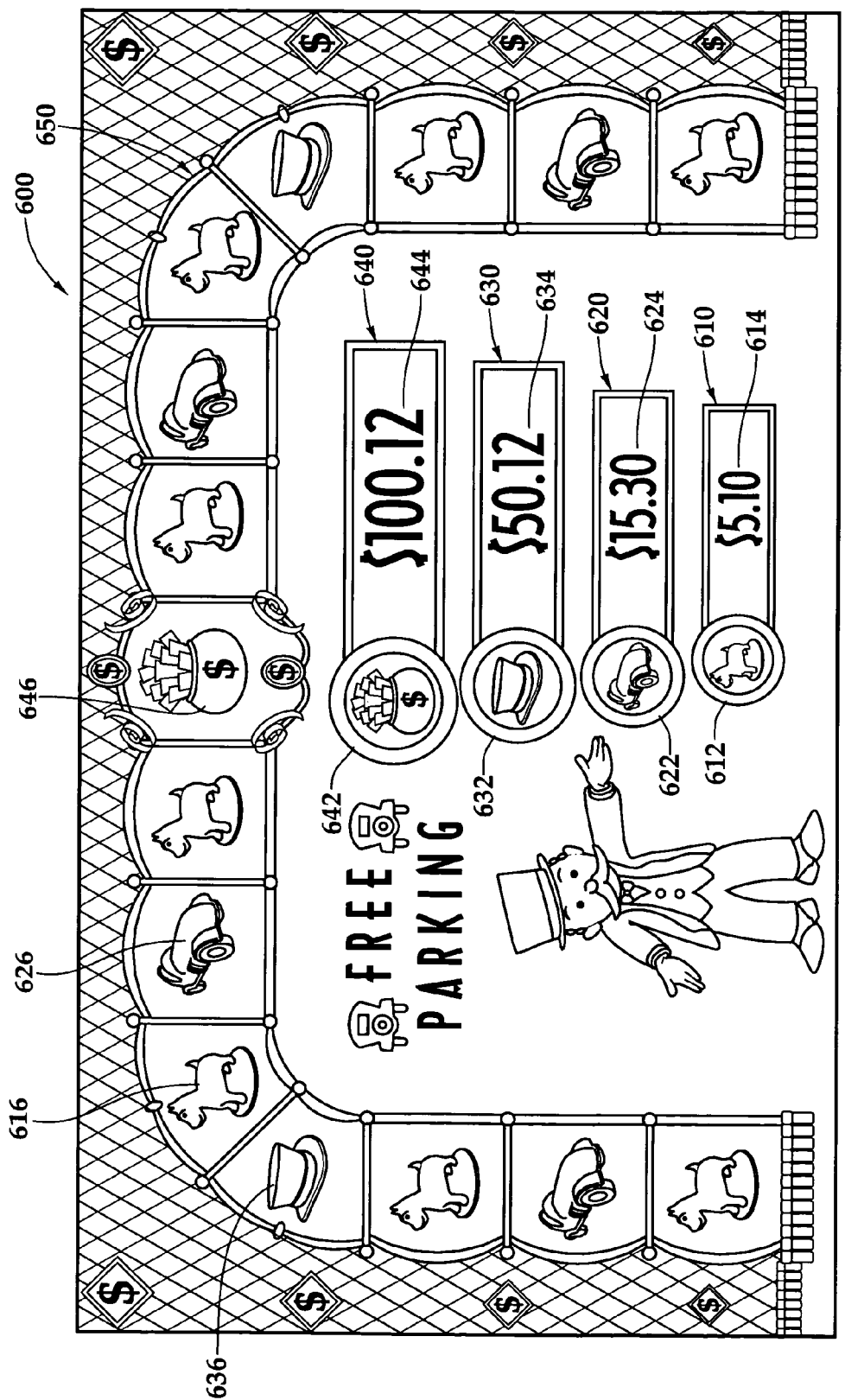
FIG. 16a is an illustration of a progressive community event, according to one embodiment of the present invention.
Figure 16B:
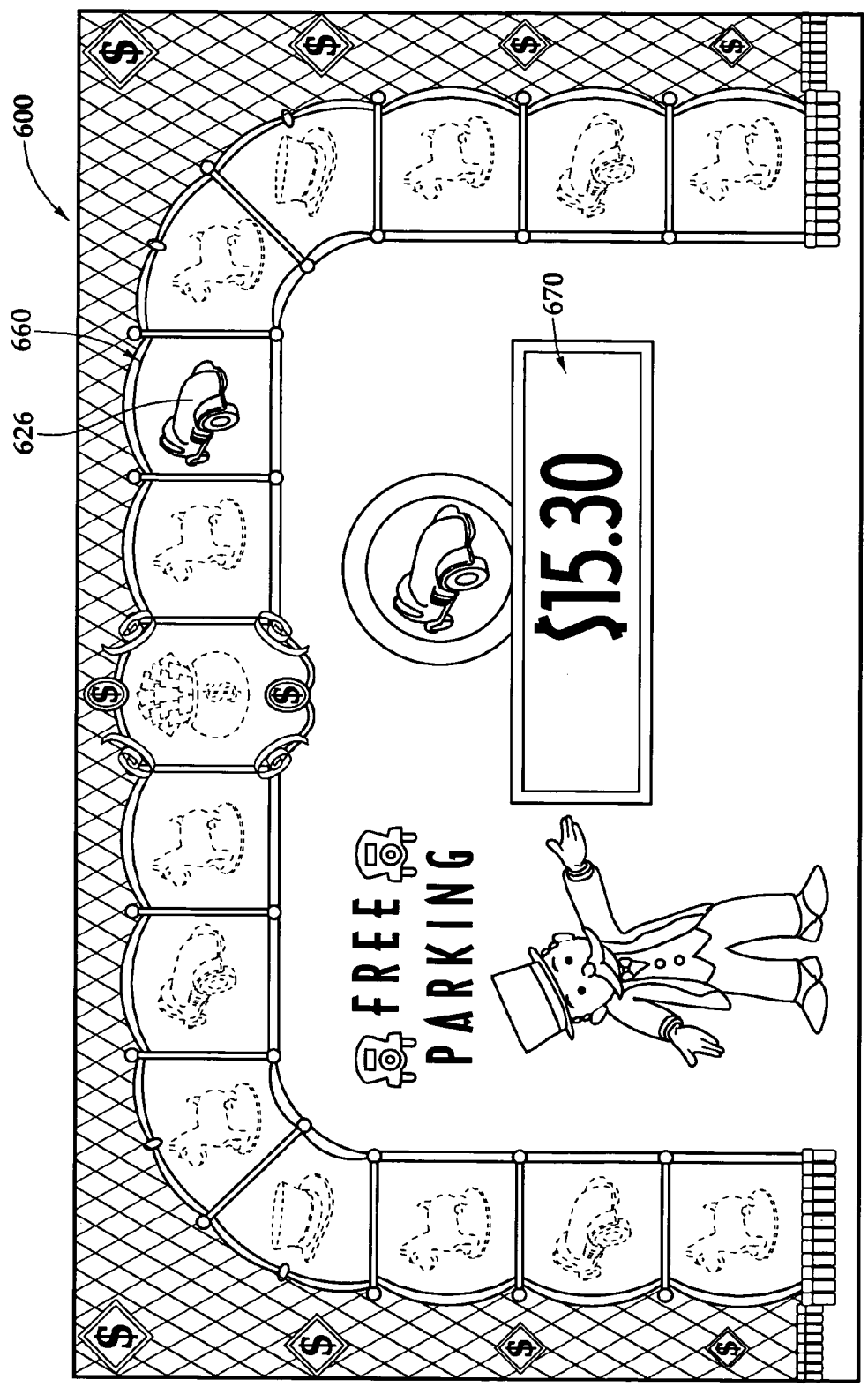
Figure 16C:
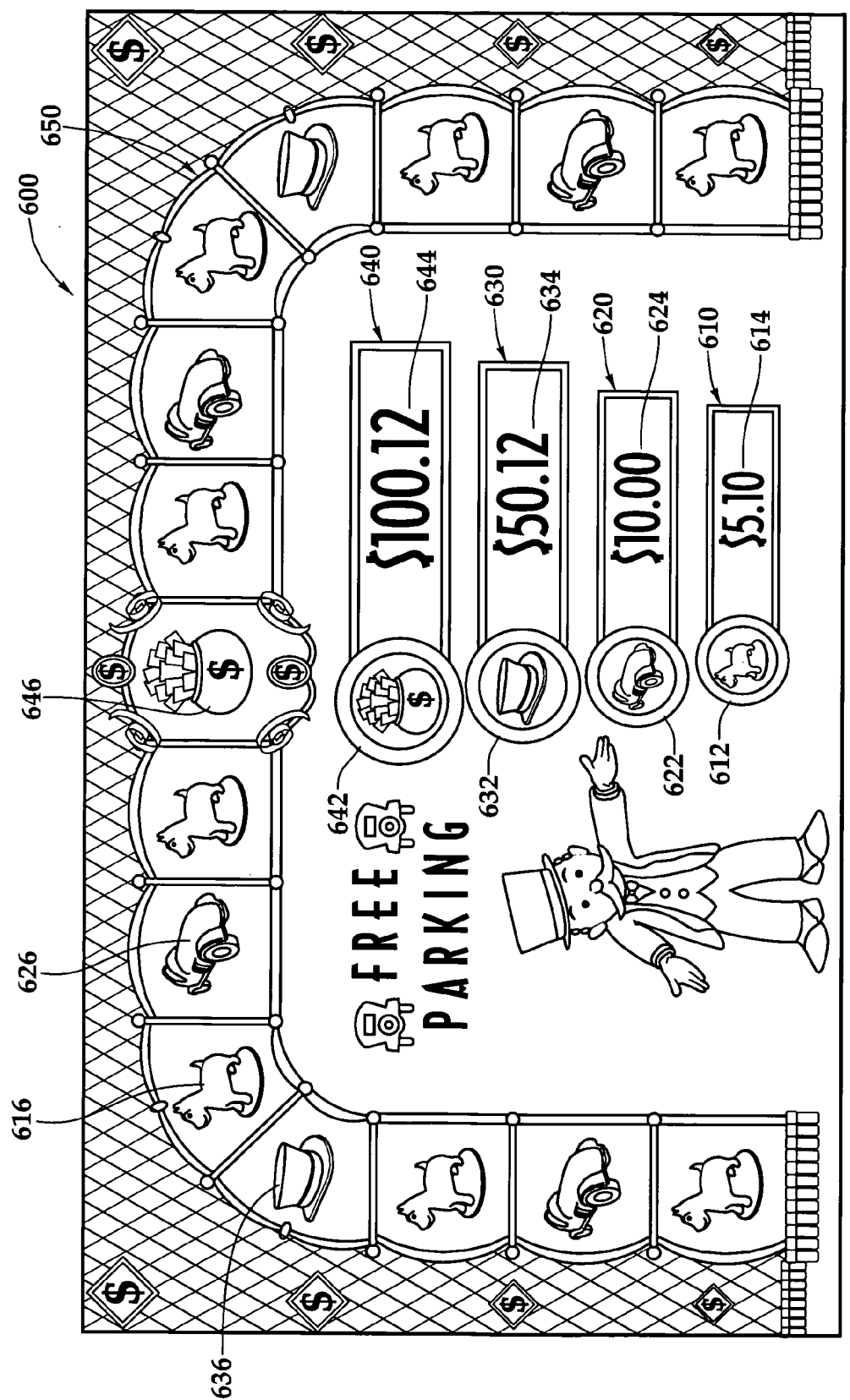
FIG. 16c is an illustration of the resetting of an award level after the selection of the selectable symbol along the selection chain of FIG. 16b.

Referring now to FIGS. 15a-b, a value-selector community event 500 adapted to be displayed on a community display (e.g., community display 132) is illustrated, according to one embodiment of the present invention. In the illustrated embodiment, the value-selector community event 500 is a "RAILROAD RICHES" community event.

When the RAILROAD RICHES community event is initiated, a moveable strip of elements 510 (e.g., numbers, symbols, etc.) is moved through a frame 520 that forms a selection area 530. The frame 520 is adapted to surround one or more of the elements from the moveable strip of elements 510. The selected elements are displayed within the selection area 530 as the moveable strip of elements 510 is moved. As illustrated in FIG. 15b, the moveable strip of elements 510 has come to rest and the selection area 530 includes the number "783." According to some embodiments, the selection of the number "783" awards 783 credits to each of the individual players participating the value-selector community event 500 or may be split among the players. In some embodiments, the awarded credits are increased by a player's value-enhancement parameter earned by playing the basic wagering game.

In the illustrated embodiment, the moveable strip 510 is illustrated as being made up of a plurality of rail cars pulled by a locomotive 540. Each rail car includes three of the elements from the moveable strip 510. In alternative embodiments, more or less elements are included in each rail car while in other embodiments, the number of elements per rail car varies from car to car. According to some embodiments of the present invention, the size of the frame 520 varies as the moveable strip 510 is moved along the display. Thus, the selection area 530 may, at times, include only a single element while, at other times, include any plurality of elements from the moveable strip 510.

Turning now to FIGS. 16a-c, a progressive community event 600 is illustrated, according to one embodiment of the present invention. The progressive community event 600, according to the illustrated embodiment, is a "FREE PARKING" community event having four potential award levels that may be selected. The first award level 610 is the smallest, and is represented by a first symbol 612, the "DOG," in the illustrated embodiment. The current value for the first award level 610 is displayed within a first-level meter 614. A plurality of first-level selectable symbols 616 are represented along a selection chain 650.

A second award level 620, generally having a larger value than the first award level 610, is represented by a second symbol 622 (e.g., a "CAR"). The current value for the second award level 620 is displayed within a second-level meter 624. A plurality of second-level selectable symbols 626 are represented along the selection chain 650. A third award level 630, generally having a larger value than both the first award level 610 and second award level 620, is represented by a third symbol 632 (e.g., a "TOPHAT"). The current value for the third award level 630 is displayed within the third-level meter 634. A plurality of third-level selectable symbols 636 are represented along the selection chain 650.

A fourth award level 640, generally having a larger value than the third award level 630, is represented by a fourth symbol 642 (e.g., a "MONEYBAG"). The current value for the fourth award level 640 is displayed within a fourth-level meter 644. At least one fourth-level selectable symbol 646 is represented along the selection chain 650.

Each of the award levels 610, 620, 630, 640 includes a progressive award value that generally increases in value over time. According to some embodiments, the progressive award values increase each time the progressive community event 600 is initiated. According to other embodiments, the progressive award values increase: each time any community event is initiated; after a predetermined period of time; after a particular game outcome is achieved; after a particular amount of wagers are accepted; or by any other method sufficient to increase the award values over time.

The selection chain 650 is illustrated as an arch surrounding a portion of the meters 614, 624, 634, 644. Each of the symbols 612, 622, 632, 642 is represented along the selection chain 650. However, the number of each of the symbols is varied so as to make the selection of the first symbol 612 more likely than the selection of the second symbol 622 and so on. Thus, it should be apparent that the likelihood of achieving the fourth award level 640 is less than the likelihood of achieving the second award level 620.

When the progressive community event 600 is initiated, a single selectable symbol is selected from the selection chain 650. As illustrated in FIG. 16b, a selected-symbol box 660 has been selected from the selection chain 650. The selected-symbol box 660, in the illustrated example, indicates to a player that one of the plurality of second-level selectable symbols 626 has been selected. An award meter 670 is displayed to indicate the amount of the award that will be awarded to each of the players participating in the community event. In some embodiments, the value within the award meter 670 is increased by a player's value-enhancement parameter earned by playing the basic wagering game.

Once a particular award level has been awarded, in this case the second award level 620, the award value resets to its predetermined second-award-level minimum which, as illustrated in FIG. 16*c*, is $10.00 in this example. It should be noted that when a particular award value is reset, the award value may, in fact, be lower than the award value for an award level beneath the reset award level. This is especially true where a particular lower award level has not been selected for an extended period of time.

The progressive award values, in some embodiments, are not directly increased by the coin-in values to the gaming system 128 (FIG. 9). For example, the progressive award values may only be increased when any of the community events are triggered or initiated. As such, the value of the progressive awards are independent of the coin-in values and are instead dependent on the number of times one of the community events is initiated. In some embodiments, the progressive award values may be increased based on the expected value for the community events as a whole, or based just on the expected value of the MONOPOLY ONCE AROUND community event.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of operating a gaming system for playing at least one casino wagering game, the gaming system including one or more controllers, a plurality of gaming machines, and a community display coupled to the plurality of gaming machines and to at least one of the one or more controllers, each gaming machine of the plurality of gaming machines including an electronic display device and one or more electronic input devices, the method comprising:

detecting, via at least one of the one or more electronic input devices of each gaming machine of the plurality of gaming machines, a physical item associated with a monetary value that establishes a credit balance;

initiating the casino wagering game, on each gaming machine of the plurality of gaming machines, in response to an input indicative of a wager covered by the credit balance;

triggering, by at least one of the one or more controllers, a community event while conducting the casino wagering game on each gaming machine of the plurality of gaming machines;

displaying the community event on the community display;

selecting, by at least one of the one or more controllers, each gaming machine of the plurality of gaming machines to participate in the community event;

selecting, by at least one of the one or more controllers without player input, from a plurality of different types of games, the community event to be displayed on the community display;

in response to an outcome of the selected community event displayed on the community display meeting a predetermined award criterion, awarding, by at least one of the one or more controllers, one or more awards to each gaming machine of the plurality of gaming machines, at least one of the one or more awards awarded to each gaming machine of the plurality of gaming machines being the same award; and receiving, via at least one of the one or more electronic input devices of each gaming machine of the plurality of gaming machines, a cashout input that initiates a payout from the credit balance.

2. The method of claim 1, wherein the selecting of the community event to be displayed on the community display is randomly selected, by at least one of the one or more controllers, from the plurality of different types of games.

3. The method of claim 1, wherein one or more of the plurality of different types of games are included as a feature in another of the plurality of independent community events.

4. The method of claim 1, further comprising, increasing, by at least one of the one or more controllers, the one or more awards credited to each gaming machine of the plurality of gaming machines based on a value-enhancement parameter earned on each of the plurality of gaming machines.

5. The method of claim 4, wherein the value-enhancement parameters earned on each gaming machine of the plurality of gaming machines are not equal.

6. The method of claim 1, wherein the at least one of the one or more controllers that select each gaming machine of the plurality of gaming machines and the at least one of the one or more controllers that select the community event are the same controller.

7. The method of claim 1, wherein the plurality of different types of games includes a progressive community event.

8. The method of claim 7, wherein the progressive community event includes a plurality of award levels, each of the award levels having an award value associated therewith.

9. The method of claim 8, wherein the award values for the plurality of award levels are not directly affected by coin-in values on each gaming machine of the plurality of gaming machines.

10. The method of claim 8, wherein the award values for the plurality of award levels are only increased in response to the selecting of the community event to be displayed from the plurality of different types of games.

11. A gaming system for playing at least one casino wagering game, the gaming system comprising:

a plurality of gaming machines with each gaming machine including an electronic display device and one or more electronic input devices;

at least one community display for displaying a community event thereon; and one or more controllers configured to:

(i) detect, via at least one of the one or more electronic input devices of each gaming machine of the plurality of gaming machines, a physical item associated with a monetary value that establishes a credit balance, (ii) initiate the casino wagering game in response to an input indicative of a wager covered by the credit balance, (iii) select each gaming machine of the plurality of gaming machines to participate in the community event, (iv) select without player input, from a plurality different types of games, the community event to be displayed on the community display, (v) in response to an outcome of the selected community event meeting a predetermined award criterion, award one or more awards to each gaming machine of the plurality of gaming machines, at least one of the one or more awards awarded to each gaming machine of the plurality of gaming machines being the same award; and (vi) receive, via at least one of the one or more electronic input devices of each gaming machine of the plurality of gaming machines, a cashout input that initiates a payout from the credit balance.

12. The gaming system of claim 11, wherein the one or more controllers are configured to randomly select the community event from the plurality of different types of games.

13. The gaming system of claim 11, wherein the selection of each gaming machine of the plurality of gaming machines to participate in the community event occurs in response to a predetermined combination of symbols being achieved on one or more of the plurality of gaming machines.

14. The gaming system of claim 11, wherein the selection of each gaming machine of the plurality of gaming machines to participate in the community event occurs in response to a random trigger being generated.

15. The gaming system of claim 11, wherein the one or more controllers are a signage controller located external to each gaming machine of the plurality of gaming machines.

16. The gaming system of claim 11, wherein the one or more controllers are located within one gaming machine of the plurality of gaming machines.

17. A method of operating a gaming system for playing at least one casino wagering game, the gaming system including one or more controllers, a plurality of gaming machines, and a community display coupled to each gaming machine of the plurality of gaming machines and to at least one of the one or more controllers, each gaming machine of the plurality of gaming machines including an electronic display device and one or more electronic input devices, the method comprising:

detecting, via at least one of the one or more electronic input devices of each gaming machine of the plurality of gaming machines, a physical item associated with a monetary value that establishes a credit balance;

initiating the casino wagering game, on each gaming of the plurality of gaming machines, in response to an input indicative of a wager covered by the credit balance;

triggering, by the one or more controllers, a community event while conducting the casino wagering game on each gaming machine of the plurality of gaming machines;

selecting, by the one or more controllers, each gaming machine of the plurality of gaming machines to participate in the community event;

selecting, by the one or more controllers and without player input, the community event from a plurality of different types of games;

displaying the community event on the community display;

in response to an outcome of the community event meeting a predetermined award criterion, awarding one or more awards to each gaming machine of the plurality of gaming machines, at least one of the one or more awards to each gaming machine of the plurality of gaming machines being the same award; and receiving, via at least one of the one or more electronic input devices of each gaming machine of the plurality of gaming machines, a cashout input that initiates a payout from the credit balance.

18. The method of claim 17, wherein the community event is triggered in response to achieving a predetermined combination of symbols on one or more gaming machines of the plurality of gaming machines.

19. The method of claim 18, wherein the selecting of the community event from the plurality of different types of games is based on the achieved predetermined combination of symbols.

20. The method of claim 17, wherein the community event is triggered randomly while conducting the casino wagering game on each gaming machine of the plurality of gaming machines.

* * * * *